(12) United States Patent
Callegari et al.

(10) Patent No.: US 12,470,556 B2
(45) Date of Patent: Nov. 11, 2025

(54) GENERATING CAPTCHAS USING GENERATIVE IMAGING MODELS

(71) Applicant: Microsoft Technology Licensing, LLC, Redmond, WA (US)

(72) Inventors: Shawn Cantin Callegari, Bellevue, WA (US); Shane Michael Chism, Bellevue, WA (US); Chipalo N. Street, Seattle, WA (US); Nicholas Becker, Boulder, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 222 days.

(21) Appl. No.: 18/213,010

(22) Filed: Jun. 22, 2023

(65) Prior Publication Data

US 2024/0320310 A1 Sep. 26, 2024

Related U.S. Application Data

(60) Provisional application No. 63/453,902, filed on Mar. 22, 2023.

(51) Int. Cl.
*H04L 9/40* (2022.01)
(52) U.S. Cl.
CPC ...... *H04L 63/10* (2013.01); *G06F 2221/2133* (2013.01)
(58) Field of Classification Search
None
See application file for complete search history.

(56) References Cited

U.S. PATENT DOCUMENTS

| | | | |
|---|---|---|---|
| 8,904,493 B1* | 12/2014 | Dibble | H04L 63/08 726/4 |
| 10,496,809 B1 | 12/2019 | Pham | |
| 10,614,207 B1 | 4/2020 | Truong | |
| 10,839,066 B1* | 11/2020 | Pham | G06F 21/40 |
| 11,461,782 B1* | 10/2022 | Zettler, Jr. | G06F 21/36 |
| 2010/0161927 A1* | 6/2010 | Sprouse | G06F 21/79 711/E12.091 |
| 2014/0059659 A1* | 2/2014 | Parekh | G06F 21/40 726/5 |
| 2014/0196133 A1* | 7/2014 | Shuster | G06F 21/31 726/7 |
| 2018/0373860 A1* | 12/2018 | Li | H04L 63/08 |
| 2021/0141876 A1* | 5/2021 | Veshchikov | G06F 21/31 |

(Continued)

OTHER PUBLICATIONS

Cheng, et al., "Image-based CAPTCHAs based on neural style transfer", IET Information Security, vol. 13, Issue 6, Nov. 1, 2019, pp. 519-529.

(Continued)

*Primary Examiner* — Boris D Grijalva Lobos

(57) ABSTRACT

Methods and systems for generating completely automated public Turing test (CAPTCHA) images are provided. In some examples, a method includes generating a plurality of images using a generative imaging model, providing the plurality of images to a user with a description that corresponds to one of a similarity or difference between the plurality of images, receiving a selection of an image of the plurality of images, determining if the selection is correct based on the provided description, and outputting an indication of whether the selection is correct.

20 Claims, 13 Drawing Sheets

(56) References Cited

U.S. PATENT DOCUMENTS

2021/0216613 A1\* 7/2021 Kumar .................... G06F 21/31
2021/0387094 A1\* 12/2021 Young ..................... A63F 13/87
2022/0350909 A1\* 11/2022 Kawakita .............. G06F 16/955

OTHER PUBLICATIONS

International Search Report and Written Opinion received for PCT Application No. PCT/US2024/18196, Jun. 19, 2024, 13 pages.

\* cited by examiner

GENERATING CAPTCHAS USING GENERATIVE IMAGING MODELS

CROSS-REFERENCE TO RELATED APPLICATION

This application claims priority to U.S. Provisional Application No. 63/453,902, titled "GENERATING CAPTCHAS USING GENERATIVE IMAGING MODELS," filed on Mar. 22, 2023, the entire disclosure of which is hereby incorporated by reference in its entirety.

BACKGROUND

A completely automated public Turing test (CAPTCHA) is a type of security measure known as challenge-response authentication. A CAPTCHA helps to protect systems, such as from spam and password decryption, by asking users to complete a simple test that proves the user is human, as compared to a computer that is trying to break into the systems.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to methods, systems, and media for generating CATPCHA images, and training users to provide accurate prompts to generative imaging models.

In some examples, one or more images for a CATPCHA are generated using a generative imaging model. The images may be generated based on a plurality of categories of variables (e.g., including a subject, a verb, a setting, a style, etc.). Each of the one or more images may be generated based on a respective prompt. The images may be provided to a user (e.g., via a graphical user-interface). In some examples, the images are a plurality of images that are provided to a user with a description that corresponds to one of a similarity or difference between the plurality of images. In such examples, a selection of an image of the plurality of images may be received (e.g., via user-input) and it may be determined if the selection is correct based on the provided description. In some examples, a description (e.g., in natural language) of the one or more images is received (e.g., via user input). The description may be compared to the respective prompts based on which the one or more images were generated, such that an indication of whether the description is correct can be output. In some examples, when the images are a plurality of images, the description includes similarities or differences between the plurality of images and is compared to similarities or difference between the prompts based on which the images were generated. Further, in some examples, the description of the one or more images is received as part of a training process that teaches users how to provide accurate prompts to generative models.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

Figure 1:
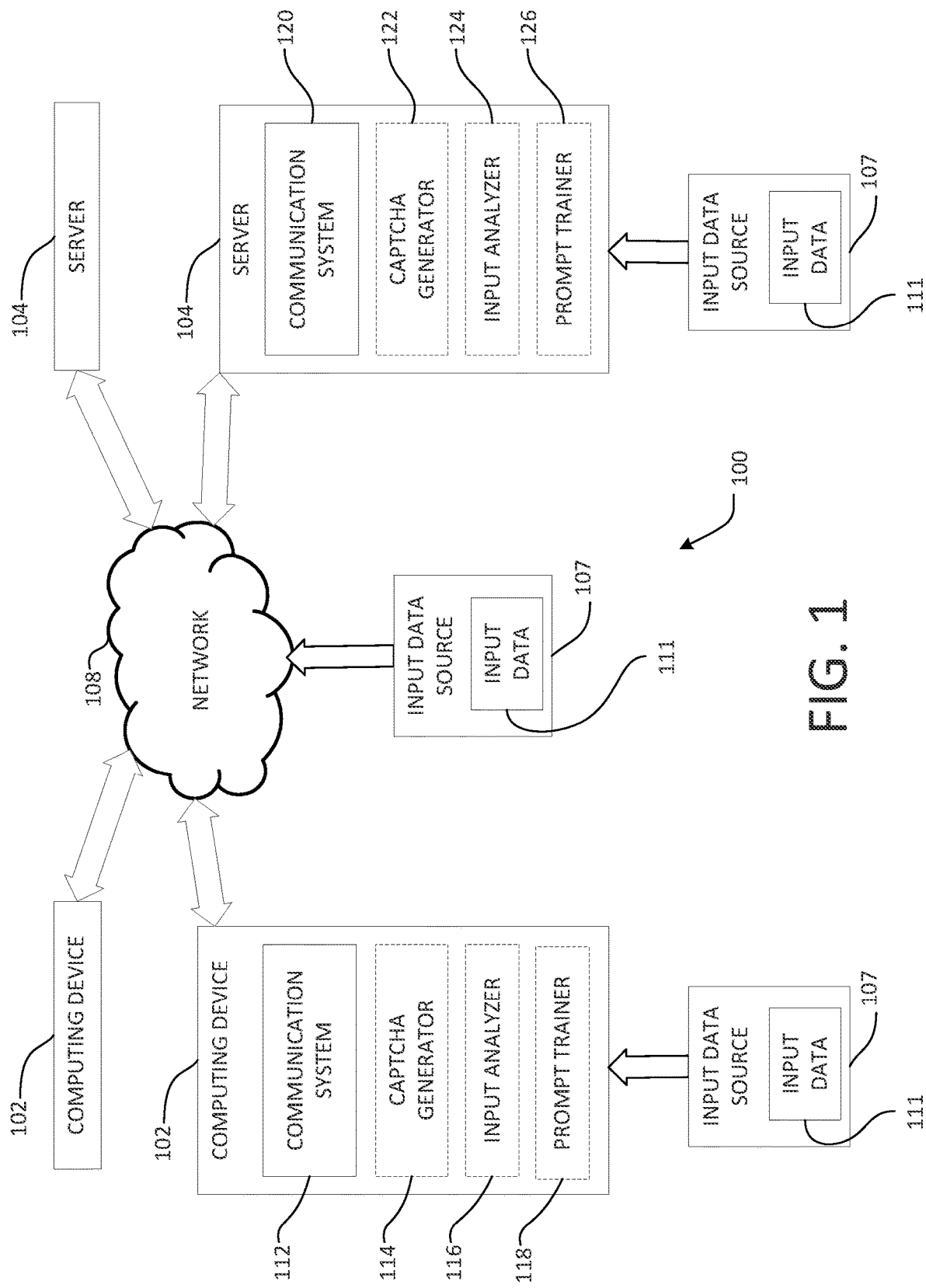
FIG. 1 illustrates an overview of an example system according to some aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Aspects may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As mentioned above, a completely automated public Turing test (CAPTCHA) is a type of security measure known as challenge-response authentication. A CAPTCHA helps to protect systems, such as from spam and password decryption, by asking users to complete a simple test that proves the user is human, as compared to a computer that is trying to break into the systems.

Traditional CAPTCHAs are boring and some recycle the same images (e.g., of a hydrant, bicycles, crosswalks, traffic lights, etc.) over and over again. Those recycled images may be retrieved from a database of images and/or scraped from images found on the Internet. Further, traditional CAPTCHAs may be relatively insecure in light of the development of new advanced machine-learning techniques.

Generative image models, such as DALL-E 2 and Stable Diffusion, can create images with near limitless subjects, across a wide range of artistic and photographic styles. These can include subjects that are mythical and impossible, but still immediately recognizable to the human eye. The variety of styles and content mean that few (if any) image recognition techniques, operated by adversarial agents, may be able to effectively identify all images and defeat the CAPTCHAs.

The present disclosure describes several ways in which image-generation artificial intelligence (AI) models can power a new generation of CAPTCHAs with increased security. Furthermore, active interaction with these controls can serve to train and improve the image generation models themselves by feeding back positive/negative human detection into the model training loop.

In some examples, an image-selection type CATPCHA may be provided with images generated by AI (e.g., a generative imagery model). For example, a user may be provided with instructions to "Select the images with horses." Images may be created with horses in various styles, positions, settings, etc. The user may be shown a number of images with horses and a number without, and be asked to select any and all images with the desired label (e.g., containing horses).

In some examples, a user may describe images. For example, the user may be shown one or more AI-generated image(s) with a number of elements that can be described. The user may be presented with a text box and asked to type a description of the image content. A countdown timer may show how much time the user has left to meet the challenge before the one or more images are replaced with one or more new images. As the user types, several factors may be assessed and processed by an AI to determine whether the user is likely a bot or a human. These include factors may include the cadence and regularity of keystrokes, incidences of mistakes, typos, backspaces, etc. The typed content (in any language) may be interpreted by an AI model to determine if, or how accurately, it describes the image that was generated.

In some examples provided herein, a plurality of images may be generated using a generative imaging model. The plurality of images may be generated based on a plurality of categories of variables, such as a subject (e.g., person, animal, object), a verb (e.g., sitting, swimming, jumping), a setting (a farm, underwater, outer space), and a style (e.g., cartoon, Picasso, watercolor, pop art, vintage, other art styles). The plurality of images may be provided to a user. In some examples, the plurality of images may be provided with a description corresponding to a similarity and/or difference between the plurality of images, such that a user may select one or more of the images based on the description. In some examples, a user may provide a description corresponding to aspects of one or more images and/or similarities/differences between one or more images. Mechanisms disclosed herein may determine whether the selection and/or the user-provided description are correct, and provide an indication of such.

Advantages of aspects disclosed herein may include an improved user experience, such as by providing images that are of more interest to a user who is completing CAPTCHA challenges. Further, aspects described herein may improve security of systems that are protected by CAPTCHAs generated according to teachings provided herein. Still further, a user may be trained on how to effectively and accurately draft prompts for generative imaging models, according to some aspects described herein. Additional and/or alternative advantages will be recognized by those of ordinary skill in the art, at least in light the present disclosure.

FIG. 1 shows an example of a system 100, in accordance with some aspects of the disclosed subject matter. The system 100 may be a system for generating CAPTCHAs. The system 100 includes one or more computing devices 102, one or more servers 104, an input data source 107, and a communication network or network 108.

The computing device 102 can receive input data 111 from the input data source 107, which may be, for example, a camera, a microphone, a computer-executed program that generates input data, and/or memory with data stored therein corresponding to input data. The input data 111 may be, for example, a voice query, text query, touch, gesture, keystroke, mouse click, gaze, or some other user input data that may be recognized by those of ordinary skill in the art. Additionally, or alternatively, the network 108 can receive input data 111 from the input data source 107.

Computing device 102 may include a communication system 112, a CAPTCHA generator 114, an input analyzer 116, and/or a prompt trainer 118. In some examples, computing device 102 can execute at least a portion of the CAPTCHA generator 114 to generate one or more images via an AI model, such as a generative imaging model. For example, one or more prompts may be provided the AI model, such that the model may generated the images based on one or more of a plurality of categories of variables. In some examples, computing device 102 can execute at least a portion of the input analyzer 116 to compare an input provided by a user to prompts used to generate the CATPCHAs. Based, on the comparison, it may be determined whether the provided input was one of correct or incorrect. In some examples, computing device 102 can execute at least a portion of the prompt trainer 118 to provide instructions to a user for guessing a prompt corresponding to an image that was generated using an AI model. In some examples, the prompt trainer 118 may provide feedback regarding whether the user's guessed prompt was correct, incorrect, and/or a degree of how correct/incorrect the guess was.

Server 104 may include a communication system 112, a CAPTCHA generator 122, an input analyzer 124, and/or a prompt trainer 126. In some examples, server 104 can execute at least a portion of the CAPTCHA generator 122 to generate one or more images via an AI model, such as a generative imaging model. For example, one or more prompts may be provided the AI model, such that the model may generated the images based on one or more of a plurality of categories of variables. In some examples, server 104 can execute at least a portion of the input analyzer 124 to compare an input provided by a user to prompts used to generate the CATPCHAs. Based, on the comparison, it may be determined whether the provided input was one of correct or incorrect. In some examples, server 104 can execute at least a portion of the prompt trainer 126 to provide instructions to a user for guessing a prompt corresponding to an image that was generated using an AI model. In some examples, the prompt trainer 126 may provide feedback regarding whether the user's guessed prompt was correct, incorrect, and/or a degree of how correct/incorrect the guess was.

Additionally, or alternatively, in some examples, computing device 102 can communicate data received from input data source 107 to the server 104 over a communication network 108, which can execute at least a portion of the CAPTCHA generator 114/122, input analyzer 116/124, and/or prompt trainer 118/126. In some examples, the CATPCHA generator 114/122, input analyzer 116/124, and/or prompt trainer 118/126 may execute one or more portions of method/process 300, 700, and/or 800 described below in connection with FIGS. 3, 7, and/or 8.

In some examples, computing device 102 and/or server 104 can be any suitable computing device or combination of devices, such as a desktop computer, a vehicle computer, a mobile computing device (e.g., a laptop computer, a smartphone, a tablet computer, a wearable computer, etc.), a server computer, a virtual machine being executed by a physical computing device, a web server, etc. Further, in some examples, there may be a plurality of computing device 102 and/or a plurality of servers 104. It should be recognized by those of ordinary skill in the art that input data 111 may be received at one or more of the plurality of computing devices 102 and/or one or more of the plurality of servers 104, such that mechanisms described herein can generate CATPCHAs and/or analyze user input associated with the CAPTCHAs.

In some examples, input data source 107 can be any suitable source of input data (e.g., a microphone, a camera, a sensor, etc.). In a more particular example, input data source 107 can include memory storing input data (e.g., local memory of computing device 102, local memory of server 104, cloud storage, portable memory connected to computing device 102, portable memory connected to server 104, privately accessible memory, publicly-accessible memory, etc.). In another more particular example, input data source 107 can include an application configured to generate input data. In some examples, input data source 107 can be local to computing device 102. Additionally, or alternatively, input data source 107 can be remote from computing device 102 and can communicate input data 111 to computing device 102 (and/or server 104) via a communication network (e.g., communication network 108).

In some examples, communication network 108 can be any suitable communication network or combination of communication networks. For example, communication network 108 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard), a wired network, etc. In some examples, communication network 108 can be a local area network (LAN), a wide area network (WAN), a public network (e.g., the Internet), a private or semi-private network (e.g., a corporate or university intranet), any other suitable type of network, or any suitable combination of networks. Communication links (arrows) shown in FIG. 1 can each be any suitable communications link or combination of communication links, such as wired links, fiber optics links, Wi-Fi links, Bluetooth links, cellular links, etc.

Figure 2:
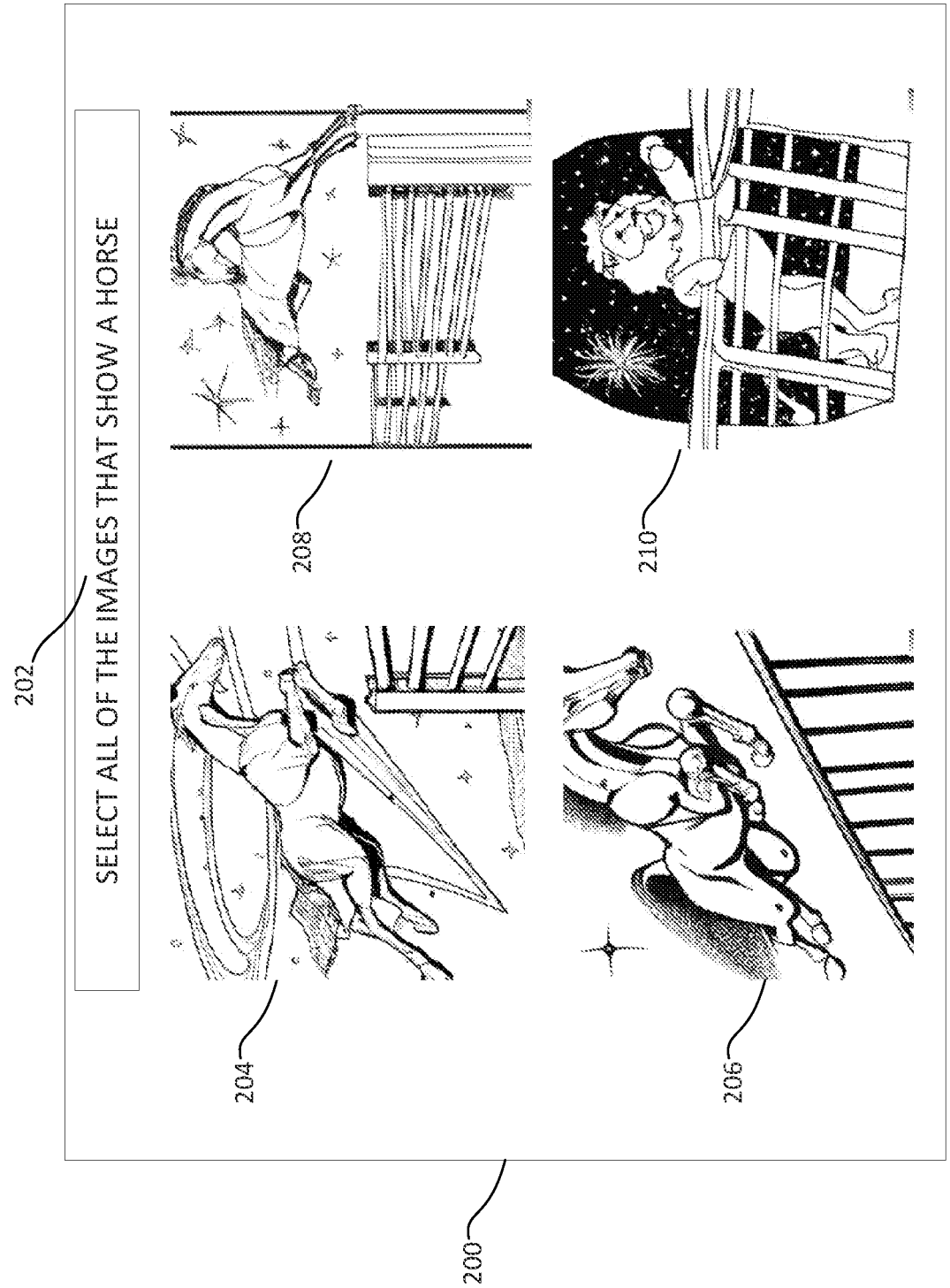
FIG. 2 illustrates an example CAPTCHA generated according to some aspects described herein.

FIG. 2 illustrates an example CAPTCHA 200 generated according to some aspects described herein. The CAPTCHA 200 includes an instruction or description 202 and a plurality of images, such as a first image 204, a second image 206, a third image 208, and a fourth image 210.

The instruction 202 may correspond to one of a similarity or difference between the plurality of images. For example, the instruction 202 illustrated in FIG. 2 instructs a user to "select all of the images that show a horse." Therefore, the illustrated instruction 202 corresponds to a similarity between each of the plurality of images 204-210. In some examples, the instruction 202 corresponds to a difference between each of the plurality of images 204-210, such as by stating "select the images that do not show a horse." Instructions may be more specific and/or more general than the above-examples. For example, the instruction 202 may guide a user to simply select one or more images that do not belong alongside the other images, without explicitly stating why the image does not belong (e.g., because it does not show the same subject, verb, setting, and/or style as the other images).

In some examples, the plurality of images 204-210 are generated by an artificial intelligence and/or machine-learning model, such as a generative imaging model. The generative imaging model may a deep learning model developed to generate images from natural language descriptions (e.g., prompts). For example, the first image 204, the second image 206, and the third image 208 may all be generated using the same first prompt (e.g., a Picasso image of a horse jumping over a fence in space). Comparatively, the fourth image 210 may be generated using a second prompt that is different than the first prompt (e.g., a Picasso image of a lion jumping over a fence in space).

The prompts used to generate the plurality of images 204-210 may include a plurality of categories of variables. For example, the plurality of categories of variables may include a subject (e.g., an animal, a person, an object, etc.), a verb (e.g., jumping, swimming, sitting, etc.), a setting (e.g., a desert, underwater, outer space, farm, etc.), and/or a style (e.g., cartoon, Picasso, pop art, vintage, pixelated, etc.). Additional and/or alternative categories of variables, and/or examples of specific variables provided herein, may be recognized by those of ordinary skill in the art. It should be recognized that the length of a prompt (e.g., the number of categories of variables and/or the number of variables included in the prompt) may impact the security standard of the prompt. For example, a longer prompt may be relatively more secure than a shorter prompt.

In some examples, the prompts may be generated based on interests specific to a user (e.g., from a database of personal data that is collected with a user's permission). Additionally, or alternatively, the prompts may be generated based on demographic features of a user (e.g., age, race, ethnicity, education, employment, etc.). Additionally, or alternatively, the prompts may be generated based on geographic boundaries corresponding to where a user is located and/or cultural norms associated with the geographic boundaries. Additional and/or alternative personalization techniques related to characteristics of a user, which may make corresponding CATPCHAs relatively more effective for and/or enjoyable to a user, may be recognized by those of ordinary skill in the art.

To generate images according to aspects provided herein, prompts may be created by fixing a variable for one or more categories of the plurality of categories and altering (e.g., randomizing) a variable for one or more other categories of the plurality of categories, such that there are distinguishable differences/similarities between images generated based on the various prompts. For example, in the plurality of images 204-210, the first, second, and third images 204-208 were generated based on prompts with the same subject, setting, verb, and style. However, the fourth image 210 only has the same setting, verb, and style, with the subject having been altered (e.g., from a horse to a lion).

A user may select one or more of the images 204-210 in response to the instruction 202. For example, a user may correctly select images 204-206 as showing horses. However, if a user were to select image 210, then the selection would be incorrect. Those of ordinary skill in the art should recognize that while four images have been shown in the example of FIG. 2, any multitude of images may be generated. Further, while the correct answer to the instruction 202 in the example of FIG. 2 includes selecting three images, those of ordinary skill in the art should recognize that in other examples, it may be correct to select a different number of images.

Further, in some examples, the CAPTCHA 200 may include a timer (not shown) that provides an indication to the user of how long they have to select one or more of the plurality of images 204-210. If the user fails to select the correct images within a time specified by the timer and/or if the user's selection(s) are incorrect, then mechanisms provided herein may generate a new set of images 204-210. Additionally, or alternatively, in some examples, the CATPCHA may lock a user out of a system and/or provide notification of a failed access attempt, in response to the user failing to select the correct images within the specified time and/or making an incorrect selection.

Figure 3:
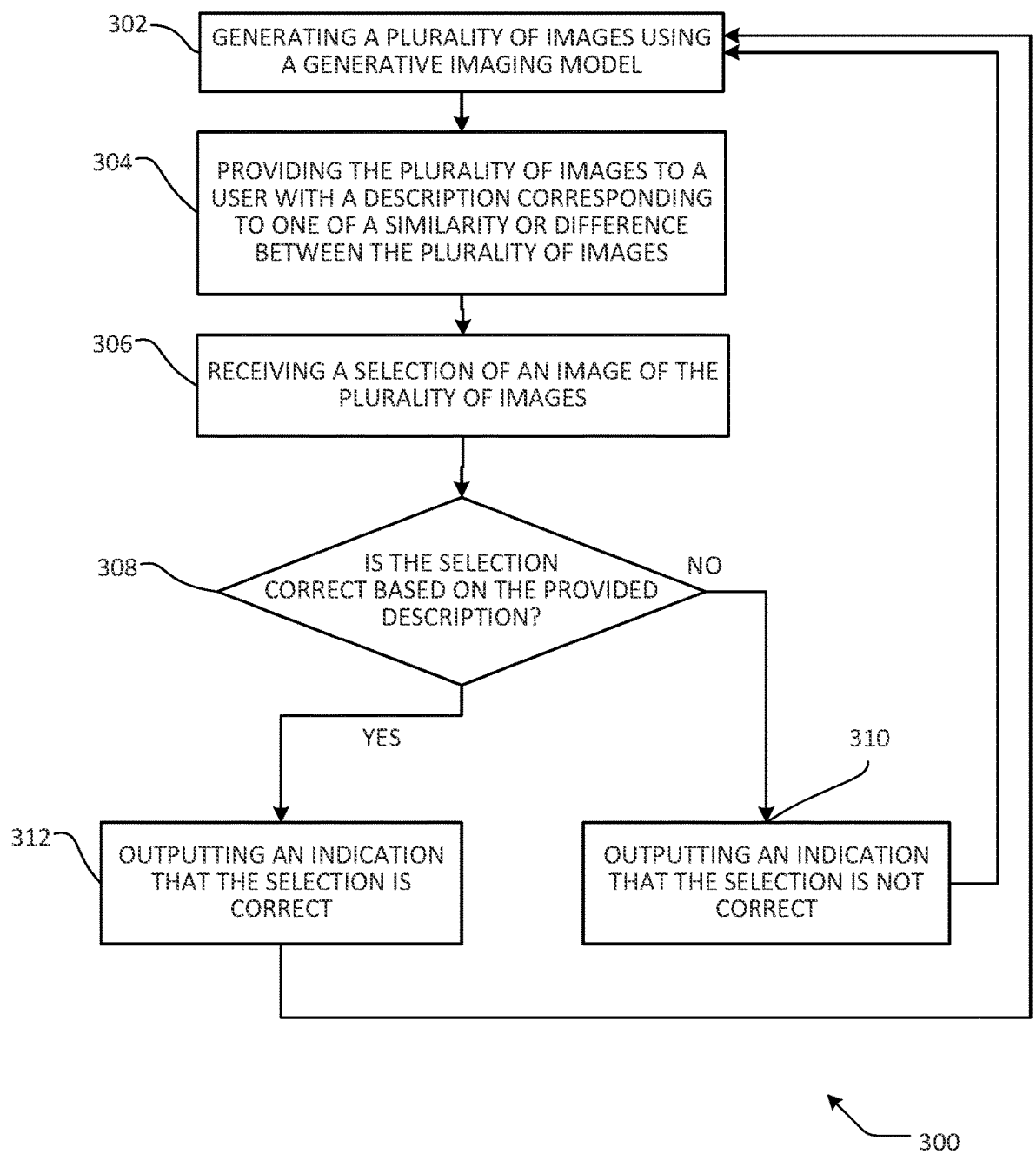
FIG. 3 illustrates an example method for generating a CATPCHA with images and receiving a selection corresponding to the images, according to some aspects described herein.

FIG. 3 illustrates an example method 300 for generating CATPCHA images, according to some aspects described herein. In examples, aspects of method 300 are performed by a device, such as computing device 102 and/or server 104, discussed above with respect to FIG. 1.

Method 300 begins at operation 302, wherein a plurality of images (e.g., images 204-210 of FIG. 2) are generated using an AI model, such as a generative imaging model. The plurality of images may be generated based on a plurality of categories of variables. For example, the plurality of images may be generated based on prompts that include the plurality of categories of variables.

The plurality of categories of variables may include a subject (e.g., an animal, a person, an object, etc.), a verb (e.g., jumping, swimming, sitting, etc.), a setting (e.g., a desert, underwater, outer space, farm, etc.), and/or a style (e.g., cartoon, Picasso, pop art, vintage, pixelated, etc.). Additional and/or alternative categories of variables, and/or examples of specific variables provided herein, may be recognized by those of ordinary skill in the art. It should be recognized that the length of a prompt (e.g., the number of categories of variables and/or the number of variables included in the prompt) may impact the security standard of the prompt. For example, a longer prompt may be relatively more secure than a shorter prompt.

In some examples, the prompts may be generated based on interests specific to a user (e.g., from a database of personal data that is collected with a user's permission). For example, the prompts may be interest or history specific to the user based on cookies, web beacons, and/or other web tracking technology recognized by those of ordinary skill in the art. Additionally, or alternatively, the prompts may be generated based on demographic features of a user (e.g., age, race, ethnicity, education, employment, etc.). Additionally, or alternatively, the prompts may be generated based on geographic boundaries corresponding to where a user is located and/or cultural norms associated with the geographic boundaries. Additional and/or alternative personalization techniques related to characteristics of a user, which may make corresponding CATPCHAs relatively more effective for and/or enjoyable to a user, may be recognized by those of ordinary skill in the art.

To generate images according to aspects provided herein, prompts may be created by fixing a variable for one or more categories of the plurality of categories and altering (e.g., randomizing) a variable for one or more other categories of the plurality of categories, such that there are distinguishable differences/similarities between images generated based on the various prompts. The variables may be retrieved from a database of variables corresponding to a given category and/or a database corresponding to the plurality of categories that includes indications of to which category a given variable is associated.

At operation 304, the plurality of images are provided to a user with a description (e.g., the description 202 of FIG. 2) corresponding to one of a similarity or difference between the plurality of images (e.g., between one or more images that form the plurality of images). The similarity or difference may be associated with one or more categories of the plurality of categories of variables, as discussed earlier herein. Further, the providing a plurality of images may include displaying the plurality of images and/or the description to a user, such as via a display screen of a computing device. Additionally, or alternatively, the images and/or the description may be provided via audio corresponding to the images and/or the description.

In some examples, the description may be generated based on one or more of the variables used to generate the plurality of images. For example, the description may instruct a user to select one or more images based on a similarity or difference based on similarities or differences between the prompts used to generate the plurality of images. Additionally, or alternatively, the descriptions may be pulled from a database of pre-prepared descriptions.

At operation 306, a selection of an image of the plurality of images is received. In some examples the selection may be of a plurality of images. The selection may be received based on an input from a user. For example, the input may be a voice query, text query, touch, gesture, keystroke, mouse click, gaze, or some other input that may be recognized by those of ordinary skill in the art as corresponding to a selection.

At operation 308, it is determined if the selection is correct based on the description provided at operation 304. For example, when the images are generated, they may include an indication of which images were generated based on prompts that include the same and/or different variables. Additionally, or alternatively, the prompts that generate the images may be analyzed to determine a semantic similarity between the prompts and the provided description.

If the selection is not correct based on the provided description, flow branches "NO" to operation 310, wherein an indication that the selection is not correct is output. For example, if a user selects one or more images not associated with the description, then the selection may be incorrect. As another example, if a user fails to select one or more images associated with the description, then the selection may also be incorrect.

The indication that the selection is incorrect may be an audio and/or visual indication. Additionally, or alternatively, the indication that the selection is incorrect may be the execution of a process, such as locking a user out of a system protected by the CAPTCHA generated via method 300. In some examples, the plurality of images are a first plurality of images, and when the method 300 reaches operation 310, the method 300 may return to operation 302 and generate a second plurality of images using the generative imaging model. Therefore, in some examples, a user may have multiple opportunities to correctly select images based on provided descriptions.

If the selection is correct based on the provided description, flow branches "YES" to operation 312, wherein an indication that the selection is correct is output. For example, if a user selects each and every one of the images associated with the description, then the selection may be correct.

The indication that the selection is correct may be an audio and/or visual indication. Additionally, or alternatively, the indication that the selection is correct may be the execution of a process, such as granting a access to a system protected by the CAPTCHA generated via method 300. In some examples, the plurality of images are a first plurality of images, and when the method 300 reaches operation 312, the method 300 may return to operation 302 and generate a second plurality of images using the generative imaging model. Therefore, in some examples, a user may be required to correctly select images multiple times based on provided descriptions, such as to increase security before being granted access to a system.

Method 300 may terminate at operation 312 and/or operation 314. Alternatively, method 300 may return to operation 302 to provide an iterative loop of generating a plurality of images using a generative imaging model, providing the plurality of images to a user with a description thereof, receiving a selection of one or more of the plurality of images, and determining if the selection is correct.

Figure 4B:
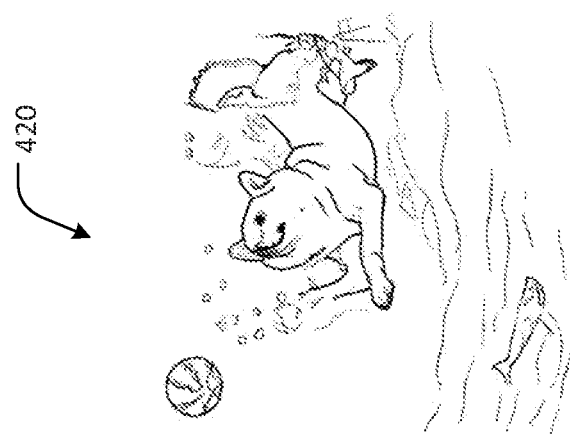
FIG. 4B illustrates an example second image that may be provided with the first image of FIG. 4A, according to some aspects described herein.
Figure 4A:
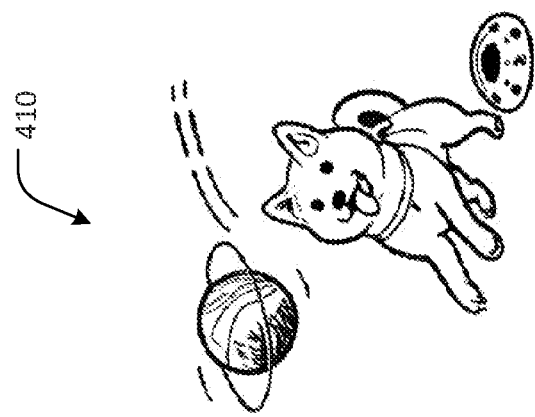
FIG. 4A illustrates an example first image that may be generated for a CAPTCHA, according to some aspects described herein.

FIG. 4A illustrates an example first image 410 that may be generated for a CATPCHA, and FIG. 4B illustrates an example second image 420 that may also be generated for a CAPTCHA, according to some aspects described herein. FIG. 4A was generated by a generative imaging model, using the prompt: "a shiba inu playing catch in space." Comparatively, FIG. 4B was generated by a generative imaging model, using the prompt: "a shiba inu playing catch underwater."

In some examples provided herein, a user may be provided with a single image, such as one of the first image 410 or the second image 420 as part of a CAPTCHA. Alternatively, in some examples, the user may be provided with a plurality of images, such as both of the first image 410 and the second image 420, as part of a CATPCHA.

In examples where the user is provided with a single image, the user may be prompted to provide a description of the single image. For example, if a user is provided with the first image 410 in a CATPCHA, then the user may advance past the CATPCHA by providing the correct description "a shiba inu playing catch in space." In some examples, the user may provide a different description, but the different description may be determined to be sufficiently similar to the correct description, such that the user may still advance past the CAPTCHA. Sufficiently similarity may be based on generating an input embedding based on the received description and comparing it to a prompt embedding that is generated based on the prompt used to generate the first image 410.

In examples where the user is provided with a plurality of images (e.g., the first image 410 and the second image 420), the user may be prompted to provide a description of each of the images (similar as was discussed above tow hen the user is provided with a single image). Additionally, or alternatively, the user may be prompted to provide a description of similarities or differences between the plurality of images (e.g., between the first image 410 and the second image 420). For example, referring to the example first and second images 410, 420 of FIGS. 4A and 4B, a user who is prompted to describe differences between the first image 410 and the second image 420 may accurately provide a description including that the first image 410 has a setting of "space", whereas the second image 420 has a setting of "underwater." Variations of exact language for the description be acceptable based on comparing an embedding of the description to an embedding of the differences between the prompt used to generate the first image 410 and the prompt used to generate the second image 420.

Referring still to the example first and second images 410, 420, a user who is prompted to describe similarities between the first image 410 and the second image 420 may accurately provide a description including that both images show a Shiba Inu playing catch. Variations of exact language for the description be acceptable based on comparing an embedding of the description to an embedding of the similarities between the prompt used to generate the first image 410 and the prompt used to generate the second image 420. For example, in some configurations of mechanisms provided herein, a user may be correct by stating that the first image 410 and the second image 420 both show a Shiba Inu, and/or both show a dog playing catch. Such tolerancing between an exactly correct answer and sufficiently correct answer may be configurable for specific use cases, while considering that systems may be relatively more secure (e.g., less accessible) with stricter tolerances.

Figure 5:
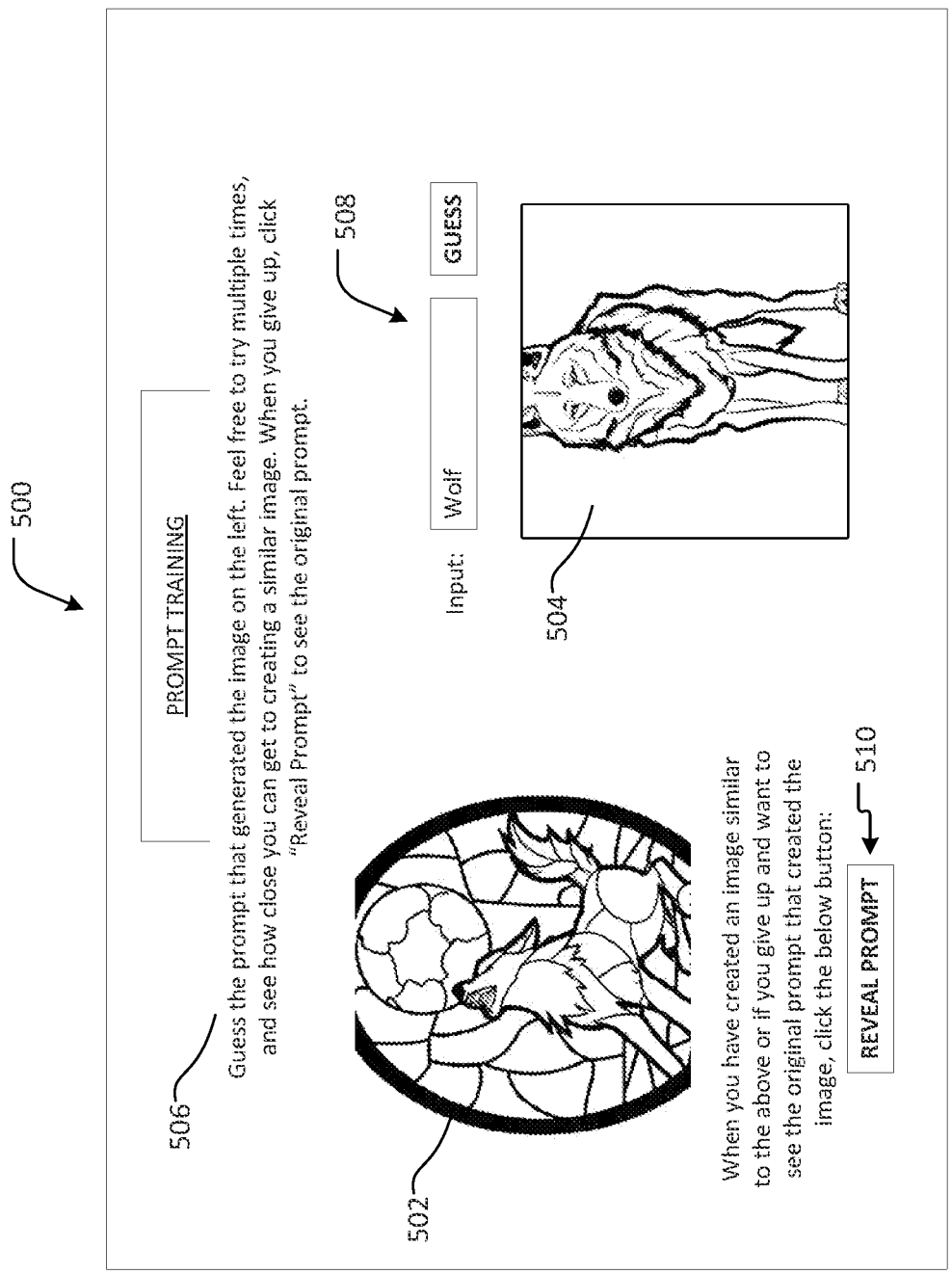
FIG. 5 illustrates an example system for training a user to provide accurate prompts to an image generator, according to some aspects described herein.

FIG. 5 illustrates an example system 500 for training a user to provide accurate prompts to an image generator, according to some aspects described herein. The example system 500 includes a first image 502, a second image 504, instructions 506, a first input interface 508, and a second input interface 510. The system 500 may include a graphical user-interface on which the first image 502, the second image 504, and/or the instructions 506 are displayed. Further, the first input interface 508 and/or the second input interface 510 may be integrated into the graphical user-interface.

The first image 502 may be generated using a generative imaging model based on a prompt. The prompt may include a plurality of categories of variables (e.g., a subject, action, style, setting, other factors), such that the first image 502 is generated based on the plurality of categories of variables. The first image 502 illustrated in FIG. 5 was generated based on the prompt "stain glass of a cartoon wolf howling at a moon."

The system 500 includes instructions 506. The instructions 506 instruct a user to try to guess a prompt that generated the first image 502. In some examples, the instructions 506 may include that a user may try to guess multiple times for the prompt that generated the first image 502. In some examples, the instructions 506 may provide the option for users to give up on guessing, such as by providing input indicative of such, and the prompt that generated the first image 502 may be revealed.

The user's guess may be provided via the first input interface 508. The first input interface 508 may receive the user's guess in the form of text (e.g., received via a text box, a chat window, etc.), audio (e.g., received from a microphone, an audio file, etc.), or in the form of another input that corresponds to a guess for a prompt that generated the first image 502. In some examples, the first input interface 508 may further include one or more buttons, such as for submitting the guess.

After receiving the guess, the example system 500 may generate, using a generative imaging model, the second image 504, based on the guess. For example, in FIG. 5, a guess was provided as "wolf." Therefore, "wolf" was used as the prompt based on which the second image 504 was generated. However, as one of ordinary skill in the art will recognize, the illustrated second image 504 does not look the same as the illustrated first image 502. Accordingly, mechanisms provided herein may determine that the second image 504 is not sufficiently similar to the first image 502 to constitute a correct guess. Alternatively, in some examples with a relatively relaxed tolerance, the second image 504 may be determined to be sufficiently similar to the first image 502.

A user may provide subsequent guesses via the first input interface 508, to update the second image 504 to try to make it look like the first image 502. Alternatively, the user may give-up on guessing and/or believe that they have guessed correctly and provide an indication of such to the second input interface 510. The second input interface 510 may be configured to receive text data, audio data, gaze data, gesture data, keystroke data, mouse data, or another type of input indicative of the user terminating the guessing process (e.g., because they give up, or because they believe they guessed correctly). In the illustrated example of FIG. 5, the second input interface 510 includes a button that a user may select to reveal the prompt that generated the first image 502. By selecting the button of the second input interface 510, the prompt that generated the first image 502 may be provided to the user (e.g., in the form of a visual and/or audio indication).

Generally the system 500 provides a gamified way to train users on how to effectively and accurately draft prompts for generative imaging models. With the rising prevalence of generative models and large language models in everyday life, training users on how to effectively interact with such models may be advantageous, such that the models can be integrated into various facets of user's lives. Additional and/or alternative advantages will be recognized by those of ordinary skill in the art, at least in light the present disclosure.

Figure 6:
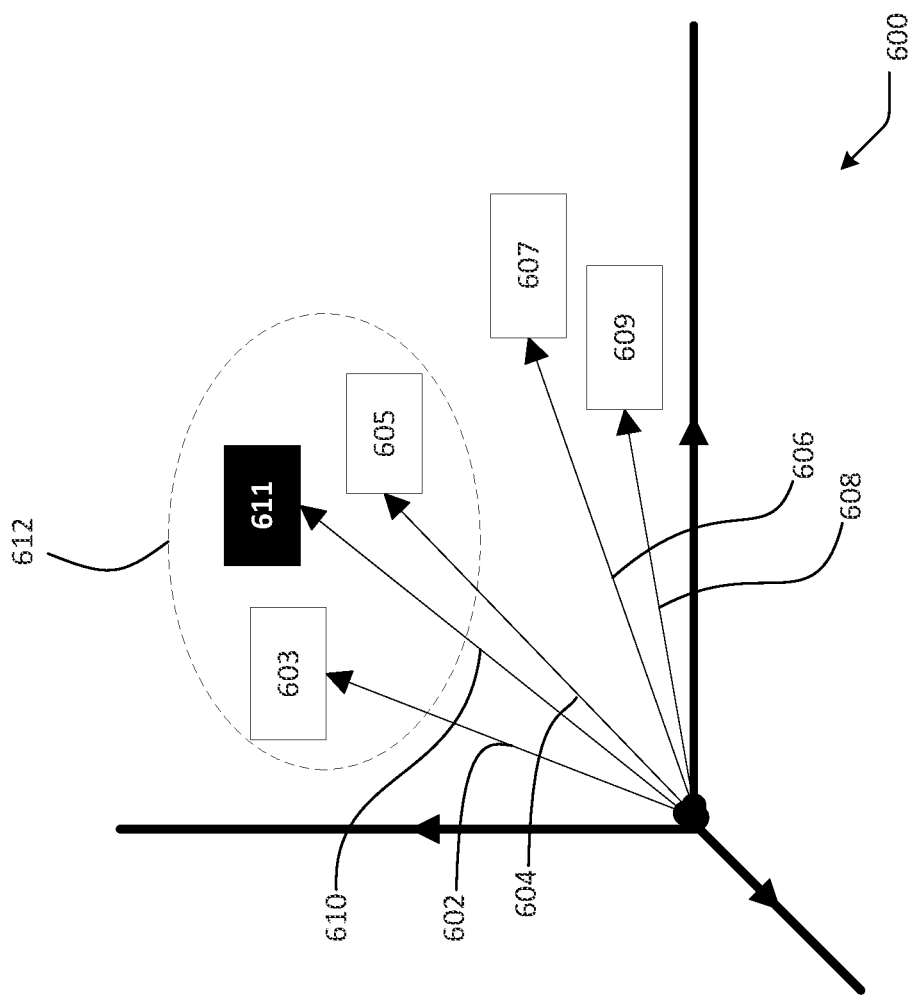
FIG. 6 illustrates an example vector space, according to some aspects described herein.

FIG. 6 illustrates an example vector space 600 according to some aspects described herein. The vector space 600 includes a plurality of feature vectors, such as a first feature vector 602, a second feature vector 604, a third feature vector 606, a fourth feature vector 608, and a fifth feature vector 610. Each of the plurality of feature vectors 602, 604, 606, and 608 correspond to a respective embedding 603, 605, 607, 609 generated based on prompt information (e.g., prompts used to generate one or more CATPCHA images, similarities between prompts, differences between prompts, etc.). The embeddings 603, 605, 607, and 609 may be semantic embeddings. The fifth feature vector 610 is generated based on an input embedding 611 (e.g., a description provided by a user describing a CATPCHA image, similarities between images, and/or differences between images).

The feature vectors 602, 604, 606, 608, 610 each have distances that are measurable between each other. For example, a distance between the feature vectors 602, 604, 606, and 608 and the fifth feature vector 610 corresponding to the input embedding 611 may be measured using cosine similarity. Alternatively, a distance between the feature vectors 602, 604, 606, 608 and the fifth feature vector 610 may be measured using another distance measuring technique (e.g., an n-dimensional distance function) that may be recognized by those of ordinary skill in the art.

A similarity of each of the feature vectors 602, 604, 606, 608 to the feature vector 610 corresponding to the input embedding 611 may be determined, for example based on the measured distances between the feature vectors 602, 604, 606, 608 and the feature vector 610. The similarity between the feature vectors 602, 604, 606, 608 and the feature vector 610 may be used to group or cluster the feature vectors 602, 604, 606, and 608 in one or more collections of feature vectors, such as a collection 612, thereby generating a collection or subset of embeddings within a threshold of relatedness.

In some examples, the collection 612 may include a predetermined number of feature vectors, such that groups of feature vectors are given a predetermined size. Additionally, or alternatively, in some examples, the distances between each of the feature vectors 602, 604, 606, 608 and the feature vector 610 corresponding to the input embedding 611 may be compared to a predetermined threshold.

The embeddings 603 and 605 that correspond to feature vectors 602 and 604, respectively, may correspond to similar prompts (e.g., provided to a generative imagery model). For example, the embedding 603 may be related to a first image generated by the generative imagery model, and the embedding 605 may be related to a second image generated by the generative imagery model.

The collection 612 may be stored in a data structure, such as a metric graph, an ANN tree, a k-d tree, an octree, another n-dimensional tree, or another data structure that may be recognized by those of ordinary skill in the art that is capable of storing vector space representations. Further, memory corresponding to the data structure in which the collection 612 is stored may be arranged or stored in a manner that groups the embeddings and/or vectors in the collection 612 together, within the data structure. In some examples, feature vectors and their corresponding embeddings generated in accordance with mechanisms described herein may be stored for an indefinite period of time. Additionally, or alternatively, in some examples, as new feature vectors and/or embeddings are generated and stored, the new feature vectors and/or embeddings may overwrite older feature vectors and/or embeddings that are stored in memory (e.g., based on metadata of the embeddings indicating a version), such as to improve memory capacity. Additionally, or alternatively, in some examples, feature vectors and/or embeddings may be deleted from memory at specified intervals of time, and/or based on an amount of memory that is available, to improve memory capacity.

Generally, the ability to store embeddings corresponding to prompts used to generate images, via a generative imagery model, allows a user to associate, compare, and/or provide feedback based on input descriptions and prompts used to generate images in a novel manner that has the benefit of being computationally efficient. Mechanisms described herein are efficient for reducing memory usage, as well as for reducing usage of processing resources to search through stored content, such as because embeddings occupy relatively little space in memory compared to alternative data objects, such as text, videos, images, etc. Additional and/or alternative advantages may be recognized by those of ordinary skill in the art.

Figure 7:
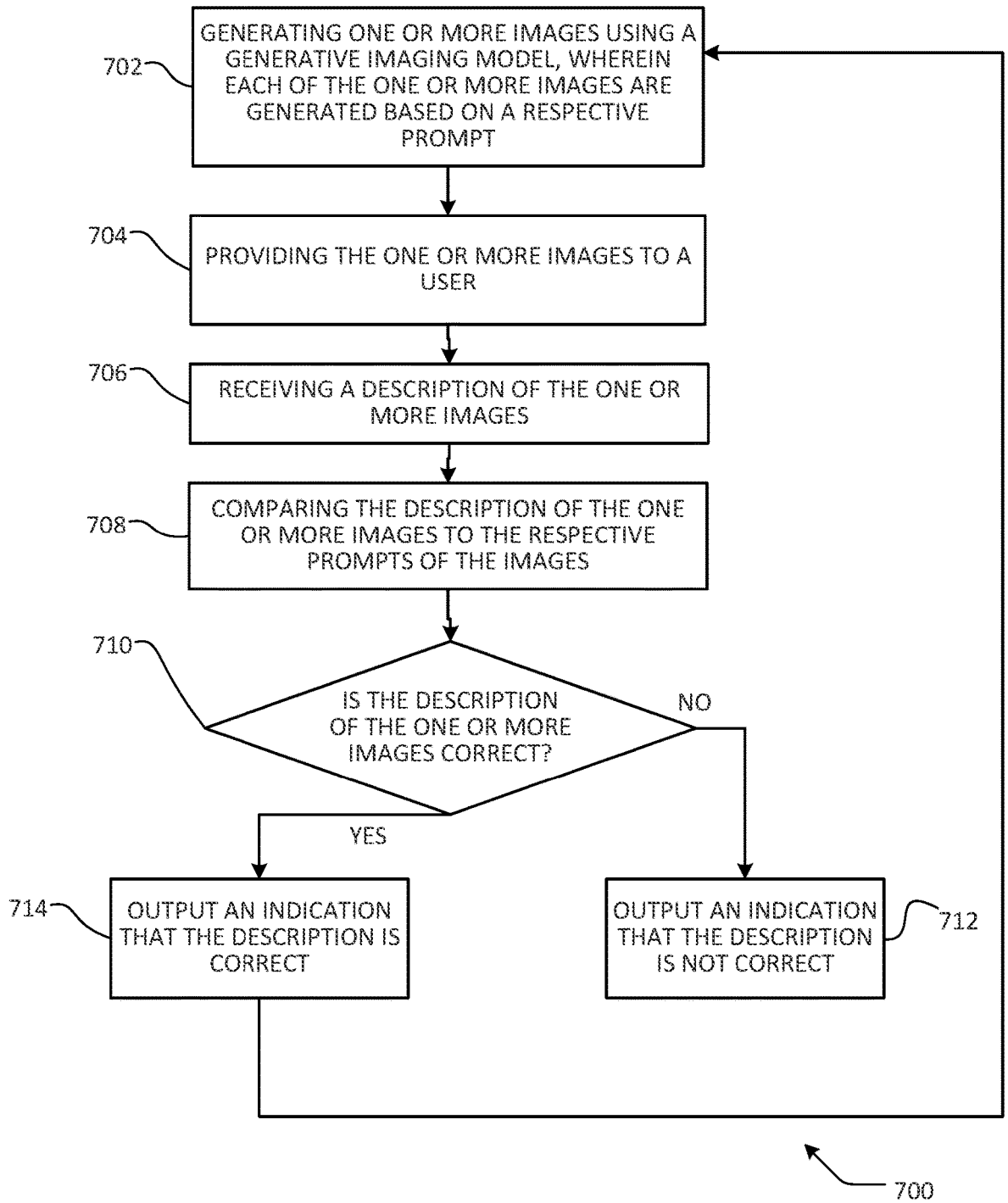
FIG. 7 illustrates an example method for generating a CAPTCHA with images and receive input corresponding to a description of the images, according to some aspects described herein.

FIG. 7 illustrates an example method 700 for generating CATPCHA images (e.g., similar as to discussed with respect to FIGS. 4A and 4B), according to some aspects described herein. Alternatively, in some examples, FIG. 7 is a method for training a user to provide accurate prompts for generating an image (e.g., similar as to discussed with respect to FIG. 5). In examples, aspects of method 700 are performed by a device, such as computing device 102 and/or server 104, discussed above with respect to FIG. 1.

Method 700 begins at operation 702 wherein one or more images (e.g., the first image 410 and/or the second image 420 of FIGS. 4A and 4B, or the first image 502 and the second image 504 of FIG. 5) are generated using a generative imaging model. Each of the one or more images are generated based on a respective prompt. The prompts may include a plurality of categories of variables, such that each of images are generated based on the plurality of categories of variables.

The plurality of categories of variables may include a subject (e.g., an animal, a person, an object, etc.), a verb (e.g., jumping, swimming, sitting, etc.), a setting (e.g., a desert, underwater, outer space, farm, etc.), and/or a style (e.g., cartoon, Picasso, pop art, vintage, pixelated, etc.). Additional and/or alternative categories of variables, and/or examples of specific variables provided herein, may be recognized by those of ordinary skill in the art. It should be recognized that the length of a prompt (e.g., the number of categories of variables and/or the number of variables included in the prompt) may impact the security standard of the prompt. For example, a longer prompt may be relatively more secure than a shorter prompt.

In some examples, the prompts may be generated based on interests specific to a user (e.g., from a database of personal data that is collected with a user's permission). Additionally, or alternatively, the prompts may be generated based on demographic features of a user (e.g., age, race, ethnicity, education, employment, etc.). Additionally, or alternatively, the prompts may be generated based on geographic boundaries corresponding to where a user is located and/or cultural norms associated with the geographic boundaries. Additional and/or alternative personalization techniques related to characteristics of a user, which may make generated images relatively more recognizable and/or enjoyable to a user, may be recognized by those of ordinary skill in the art.

To generate images according to aspects provided herein, prompts may be created by fixing a variable for one or more categories of the plurality of categories and altering (e.g., randomizing) a variable for one or more other categories of the plurality of categories, such that there are distinguishable differences/similarities between images generated based on the various prompts. The variables may be retrieved from a database of variables corresponding to a given category and/or a database corresponding to the plurality of categories that includes indications of to which category a given variable is associated.

At operation 704, the one or more images are provided to a user. Providing the images may include displaying the images, such as via a display screen of a computing device. For example, the images may be integrated into a graphical user-interface being shown on the display screen.

At operation 706, a description of the one or more images is received. The description may be in natural language. For example, a user may provide the description via a text input and/or via a speech input that include natural language. In some examples, the description may be a guess (e.g., as shown in the first input interface 508 of FIG. 5) of what prompt generated the one or more provided images.

At operation 708, the description of the one or more images is compared to the respective prompts of the images. In some examples, the comparing is a standard text comparison using techniques that may be recognized by those of ordinary skill in the art. In some examples, the comparing includes generating an input embedding based on the received description. For example, the received description may be provided to a model, such as a machine-learning model, that is trained to generate embeddings based on natural language. A prompt embedding may also be generated based on the prompts used to generate the one or more images at operation 702. For example, the prompts may be provided to a model, such as a machine-learning model, that is trained to generate embeddings based on prompts.

A distance may be determined between the input embedding and the prompt embedding, such as within a vector space. The distance may be determined based on cosine similarity or another distance measurement that may be recognized by those of ordinary skill in the art. The distance may be compared to a similarity threshold (e.g., as may be configured for specific use cases), thereby determining if the description is correct (e.g., if the prompt embedding is similar enough to the input embedding, based on the similarity threshold, even if not exact).

At operation 710, it is determined if the description of the one or more images is correct. For example, the determining may include checking the result of comparing the description of the one or more images to the respective prompts of the images.

If the description is determined to not be correct, flow branches "NO" to operation 712, wherein an indication that the description is not correct is output. For example, if a user provides a description of the one or more images that is not similar enough to the prompts of the one or more images, then the description may be determined to be incorrect. As another example, if the one or more images are a plurality of images, and a user fails to provide a description of a similarity or difference between the images that is similar enough to a similarity or difference between prompts of the images, then the description may be determined to be incorrect.

The indication that the selection is incorrect may be an audio and/or visual indication. Additionally, or alternatively, the indication that the selection is incorrect may be the execution of a process, such as locking a user out of a system protected by the CAPTCHA generated via method 700. In some examples, the one or more images are a first set of one or more images, and when the method 700 reaches operation 712, the method 700 may return to operation 702 and generate a second set of one or more images using the generative imaging model. Therefore, in some examples, a user may have multiple opportunities to correctly describe images.

In some examples, the indication indicates that the description is not correct and the method 700 further includes receiving a signal (e.g., from the second input interface 510 of FIG. 5) that corresponds to the user terminating providing descriptions (e.g., giving up on guessing a description for the image). Subsequently, the prompt(s) based on which the one or more images were generated may be provided. By providing the prompt to a user who has given up on guessing, a user may be able to learn what they were expected to guess. Such a gamified learning process may be beneficial for teaching users how to provide relatively accurate prompts for generating the one or more images, as may be useful should the user interface with a generative imaging model.

If the description is determined to be correct, flow branches "YES" to operation 714, wherein an indication that the description is correct is output. For example, if a user provides a description of the one or more images that is similar enough to the prompts of the one or more images, then the description may be determined to be correct. As another example, if the one or more images are a plurality of images, and a user provides a description of a similarity or difference between the images that is similar enough to a similarity or difference between prompts of the images, then the description may be determined to be correct.

The indication that the description is correct may be an audio and/or visual indication. Additionally, or alternatively, the indication that the selection is correct may be the execution of a process, such as granting a access to a system protected by the CAPTCHA generated via method 700. In some examples, the one or more images are a first set of one or more images, and when the method 700 reaches operation 712, the method 700 may return to operation 702 and generate a second set of one or more images using the generative imaging model. Therefore, in some examples, a user may be required to correctly describe images multiple times, such as to increase security before being granted access to a system.

Method 700 may terminate at operation 712 and/or operation 714. Alternatively, method 700 may return to operation 702 to provide an iterative loop of generating one or more images using a generative imaging model, receiving a description thereof, and determining if the description of the images is correct.

Figure 8:
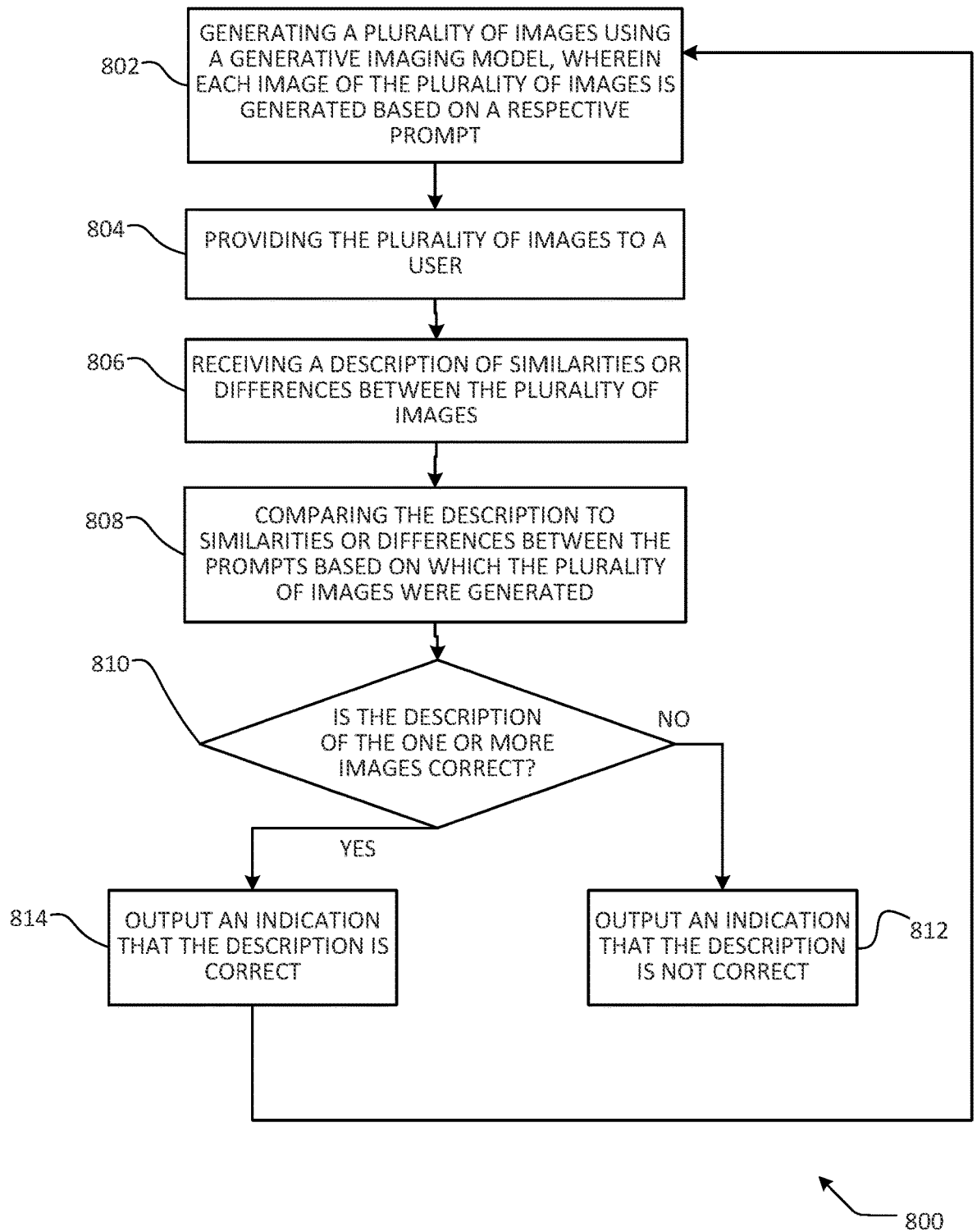
FIG. 8 illustrates an example method for generating a CAPTCHA with images and receive input corresponding to a description of the images, according to some aspects described herein.

FIG. 8 illustrates an example method 800 for generating CATPCHA images, according to some aspects described herein. In examples, aspects of method 800 are performed by a device, such as computing device 102 and/or server 104, discussed above with respect to FIG. 1.

Method 800 begins at operation 802 wherein a plurality of images (e.g., the first image 410 and the second image 420) are generated using a generative imaging model. Each image of the plurality of images is generated based on a respective prompt. The prompts may include a plurality of categories of variables, such that each of images are generated based on the plurality of categories of variables.

The plurality of categories of variables may include a subject (e.g., an animal, a person, an object, etc.), a verb (e.g., jumping, swimming, sitting, etc.), a setting (e.g., a desert, underwater, outer space, farm, etc.), and/or a style (e.g., cartoon, Picasso, pop art, vintage, pixelated, etc.). Additional and/or alternative categories of variables, and/or examples of specific variables provided herein, may be recognized by those of ordinary skill in the art. It should be recognized that the length of a prompt (e.g., the number of categories of variables and/or the number of variables included in the prompt) may impact the security standard of the prompt. For example, a longer prompt may be relatively more secure than a shorter prompt.

In some examples, the prompts may be generated based on interests specific to a user (e.g., from a database of personal data that is collected with a user's permission). Additionally, or alternatively, the prompts may be generated based on demographic features of a user (e.g., age, race, ethnicity, education, employment, etc.). Additionally, or alternatively, the prompts may be generated based on geographic boundaries corresponding to where a user is located and/or cultural norms associated with the geographic boundaries. Additional and/or alternative personalization techniques related to characteristics of a user, which may make corresponding CATPCHAs relatively more effective for and/or enjoyable to a user, may be recognized by those of ordinary skill in the art.

To generate images according to aspects provided herein, prompts may be created by fixing a variable for one or more categories of the plurality of categories and altering (e.g., randomizing) a variable for one or more other categories of the plurality of categories, such that there are distinguishable differences/similarities between images generated based on the various prompts. The variables may be retrieved from a database of variables corresponding to a given category and/or a database corresponding to the plurality of categories that includes indications of to which category a given variable is associated.

At operation 804, the plurality of images are provided to a user. Providing the plurality of images may include displaying the plurality of images, such as via a display screen of a computing device. Additionally, or alternatively, the images may be provided via audio corresponding to the images.

At operation 806, a description of similarities or differences between the plurality of images is received. The description may be in natural language. For example, a user may provide the description via a text input and/or via a speech input that include natural language.

In some examples, the similarities or differences between the prompts may be based on similarities or difference between the plurality of categories of variables. For example, a first image may have one of a different subject, verb, setting, or style than a second image. Additionally, or alternatively, a first image may have one of a same subject, verb, setting, or style than a second image. Accordingly, the description may include an identification of which variables in the prompts based on which the first image and the second image were generated differ between the first image and the second image.

At operation 808, the description is compared to similarities or differences between the prompts (e.g., the prompts based on which the plurality of images were generated). In some examples, the comparing includes generating an input embedding based on the received description. For example, the received description may be provided to a model, such as a machine-learning model, that is trained to generate embeddings based on natural language. A prompt embedding may also be generated based on similarities or differences between the prompts used to generate the plurality of images at operation 802. For example, the similarities or difference may be identified and provided to a model, such as a machine-learning model, that is trained to generate embeddings.

A distance may be determined between the input embedding and the prompt embedding, such as within a vector space. The distance may be determined based on cosine similarity or another distance measurement that may be recognized by those of ordinary skill in the art. The distance may be compared to a similarity threshold (e.g., as may be configured for specific use cases), thereby determining if the description is correct (e.g., if the prompt embedding is similar enough to the input embedding, based on the similarity threshold, even if not exact).

At operation 810, it is determined if the description of the one or more images is correct. For example, the determining may include checking the result of comparing the description of the plurality of images to the similarities or differences between the prompts of the images.

If the description is determined to not be correct, flow branches "NO" to operation 812, wherein an indication that the description is not correct is output. For example, if a user provides a description that is not similar enough to the similarities or differences of the prompts of the one or more images, then the description may be determined to be incorrect.

The indication that the selection is incorrect may be an audio and/or visual indication. Additionally, or alternatively, the indication that the selection is incorrect may be the execution of a process, such as locking a user out of a system protected by the CAPTCHA generated via method 800. In some examples, the images are a first set of images, and when the method 700 reaches operation 812, the method 800 may return to operation 802 and generate a second set of images using the generative imaging model. Therefore, in some examples, a user may have multiple opportunities to correctly describe similarities and/or differences between images.

If the description is determined to be correct, flow branches "YES" to operation 814, wherein an indication that the description is correct is output. For example, if a user provides a description that is similar enough to the similarities or differences between the prompts of the images, then the description may be determined to be correct.

The indication that the description is correct may be an audio and/or visual indication. Additionally, or alternatively, the indication that the selection is correct may be the execution of a process, such as granting a access to a system protected by the CAPTCHA generated via method 800. In some examples, the images are a first set of images, and when the method 800 reaches operation 812, the method 800 may return to operation 802 and generate a second set of images using the generative imaging model. Therefore, in some examples, a user may be required to correctly describe similarities and/or differences between images multiple times, such as to increase security before being granted access to a system.

Method 800 may terminate at operation 812 and/or operation 814. Alternatively, method 800 may return to operation 802 to provide an iterative loop of generating a plurality of images using a generative imaging model, receiving a description of similarities or differences between the plurality of images, and determining if the description of the images is correct.

Figure 9A:
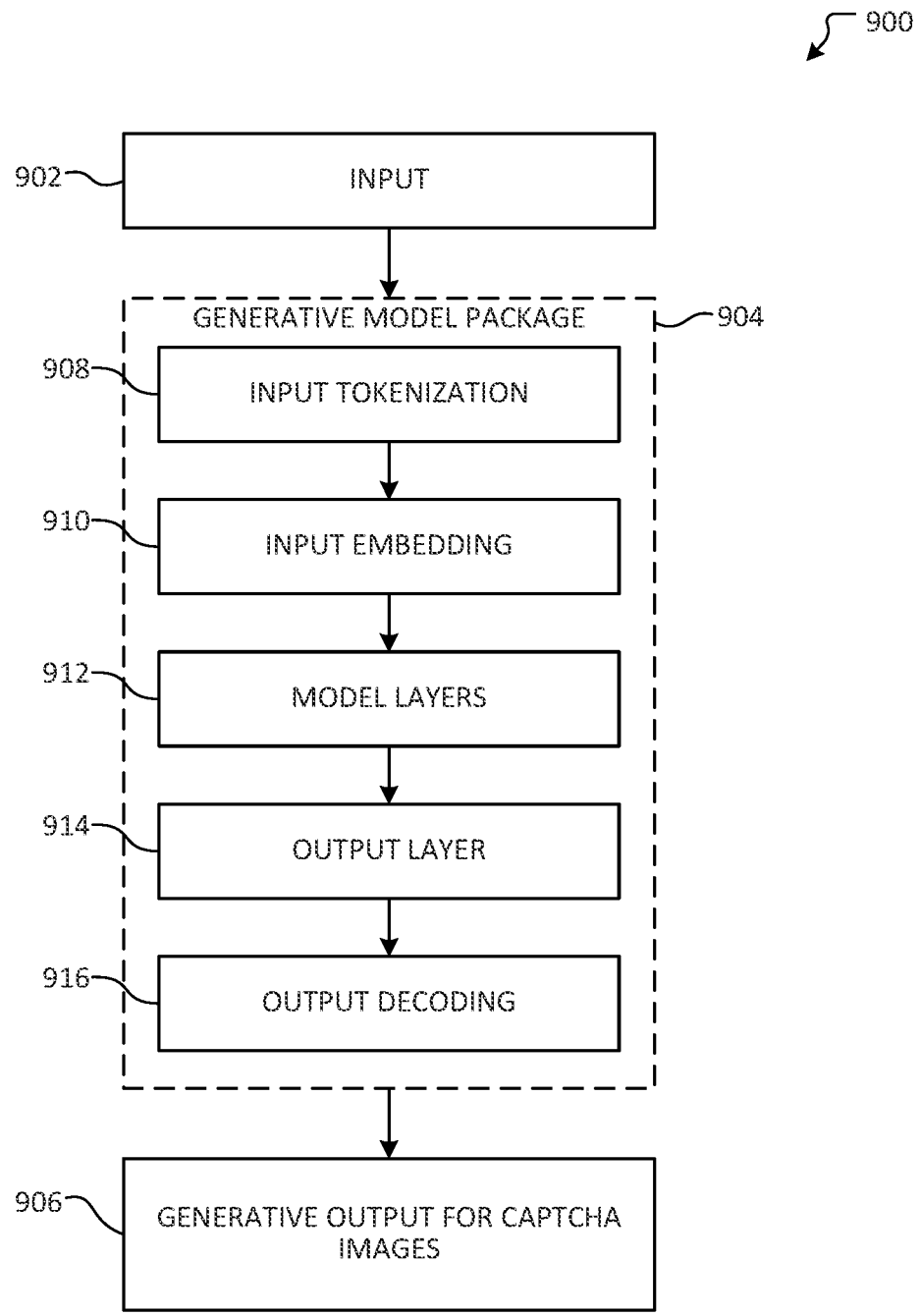
FIGS. 9A and 9B illustrate overviews of an example generative machine learning model that may be used according to aspects described herein.
Figure 9B:
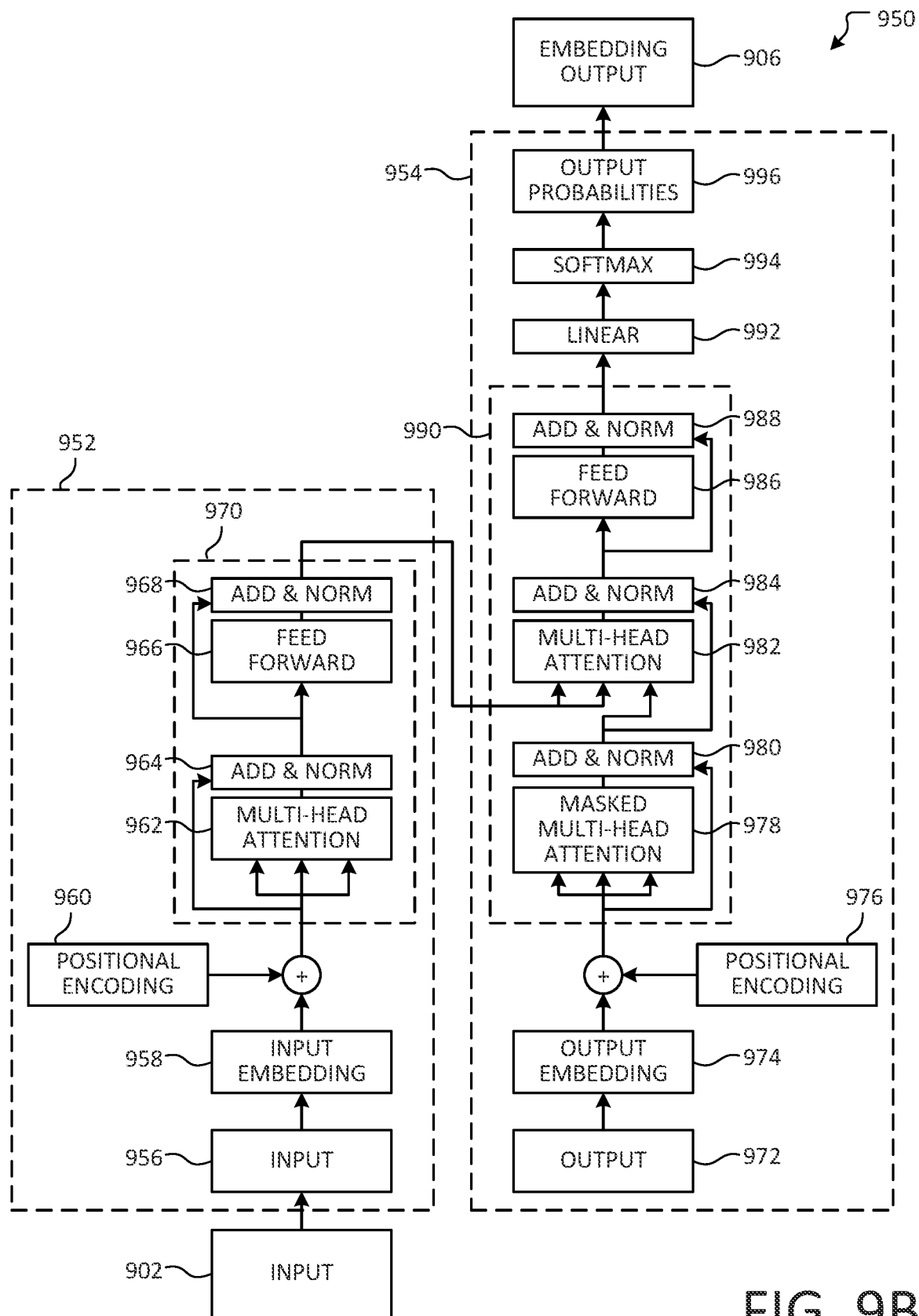

FIGS. 9A and 9B illustrate overviews of an example generative machine learning model that may be used according to aspects described herein. With reference first to FIG. 9A, conceptual diagram 900 depicts an overview of pre-trained generative model package 904 that processes an input 902 to generate output for CAPTCHA images 906 according to aspects described herein. Examples of pre-trained generative model package 904 includes, but is not limited to, Megatron-Turing Natural Language Generation model (MT-NLG), Generative Pre-trained Transformer 3 (GPT-3), Generative Pre-trained Transformer 4 (GPT-4), BigScience BLOOM (Large Open-science Open-access Multilingual Language Model), DALL-E, DALL-E 2, Stable Diffusion, or Jukebox.

In examples, generative model package 904 is pre-trained according to a variety of inputs (e.g., a variety of human languages, a variety of programming languages, and/or a variety of content types) and therefore need not be finetuned or trained for a specific scenario. Rather, generative model package 904 may be more generally pre-trained, such that input 902 includes a prompt that is generated, selected, or otherwise engineered to induce generative model package 904 to produce certain generative model output 906. For example, a prompt includes a context and/or one or more completion prefixes that thus preload generative model package 904 accordingly. As a result, generative model package 904 is induced to generate output based on the prompt that includes a predicted sequence of tokens (e.g., up to a token limit of generative model package 904) relating to the prompt. In examples, the predicted sequence of tokens is further processed (e.g., by output decoding 916) to yield output 906. For instance, each token is processed to identify a corresponding word, word fragment, or other content that forms at least a part of output 906. It will be appreciated that input 902 and generative model output 906 may each include any of a variety of content types, including, but not limited to, text output, image output, audio output, video output, programmatic output, and/or binary output, among other examples. In examples, input 902 and generative model output 906 may have different content types, as may be the case when generative model package 904 includes a generative multimodal machine learning model.

As such, generative model package 904 may be used in any of a variety of scenarios and, further, a different generative model package may be used in place of generative model package 904 without substantially modifying other associated aspects (e.g., similar to those described herein with respect to FIGS. 1-8). Accordingly, generative model package 904 operates as a tool with which machine learning processing is performed, in which certain inputs 902 to generative model package 904 are programmatically generated or otherwise determined, thereby causing generative model package 904 to produce model output 906 that may subsequently be used for further processing.

Generative model package 904 may be provided or otherwise used according to any of a variety of paradigms. For example, generative model package 904 may be used local to a computing device (e.g., computing device 102 in FIG. 1) or may be accessed remotely from a machine learning service. In other examples, aspects of generative model package 904 are distributed across multiple computing devices. In some instances, generative model package 904 is accessible via an application programming interface (API), as may be provided by an operating system of the computing device and/or by the machine learning service, among other examples.

With reference now to the illustrated aspects of generative model package 904, generative model package 904 includes input tokenization 908, input embedding 910, model layers 912, output layer 914, and output decoding 916. In examples, input tokenization 908 processes input 902 to generate input embedding 910, which includes a sequence of symbol representations that corresponds to input 902. Accordingly, input embedding 910 is processed by model layers 912, output layer 914, and output decoding 916 to produce model output 906. An example architecture corresponding to generative model package 904 is depicted in FIG. 9B, which is discussed below in further detail. Even so, it will be appreciated that the architectures that are illustrated and described herein are not to be taken in a limiting sense and, in other examples, any of a variety of other architectures may be used.

FIG. 9B is a conceptual diagram that depicts an example architecture 950 of a pre-trained generative machine learning model that may be used according to aspects described herein. As noted above, any of a variety of alternative architectures and corresponding ML models may be used in other examples without departing from the aspects described herein.

As illustrated, architecture 950 processes input 902 to produce generative model output 906, aspects of which were discussed above with respect to FIG. 9A. Architecture 950 is depicted as a transformer model that includes encoder 952 and decoder 954. Encoder 952 processes input embedding 958 (aspects of which may be similar to input embedding 910 in FIG. 9A), which includes a sequence of symbol representations that corresponds to input 956. In examples, input 956 includes input content 902 which may include a user-input and/or a machine-generated input, such as a prompt, a command, context, or the like.

Further, positional encoding 960 may introduce information about the relative and/or absolute position for tokens of input embedding 958. Similarly, output embedding 974 includes a sequence of symbol representations that correspond to output 972, while positional encoding 976 may similarly introduce information about the relative and/or absolute position for tokens of output embedding 974.

As illustrated, encoder 952 includes example layer 970. It will be appreciated that any number of such layers may be used, and that the depicted architecture is simplified for illustrative purposes. Example layer 970 includes two sub-layers: multi-head attention layer 962 and feed forward layer 966. In examples, a residual connection is included around each layer 962, 966, after which normalization layers 964 and 968, respectively, are included.

Decoder 954 includes example layer 990. Similar to encoder 952, any number of such layers may be used in other examples, and the depicted architecture of decoder 954 is simplified for illustrative purposes. As illustrated, example layer 990 includes three sub-layers: masked multi-head attention layer 978, multi-head attention layer 982, and feed forward layer 986. Aspects of multi-head attention layer 982 and feed forward layer 986 may be similar to those discussed above with respect to multi-head attention layer 962 and feed forward layer 966, respectively. Additionally, masked multi-head attention layer 978 performs multi-head attention over the output of encoder 952 (e.g., output 972). In examples, masked multi-head attention layer 978 prevents positions from attending to subsequent positions. Such masking, combined with offsetting the embeddings (e.g., by one position, as illustrated by multi-head attention layer 982), may ensure that a prediction for a given position depends on known output for one or more positions that are less than the given position. As illustrated, residual connections are also included around layers 978, 982, and 986, after which normalization layers 980, 984, and 988, respectively, are included.

Multi-head attention layers 962, 978, and 982 may each linearly project queries, keys, and values using a set of linear projections to a corresponding dimension. Each linear projection may be processed using an attention function (e.g., dot-product or additive attention), thereby yielding n-dimensional output values for each linear projection. The resulting values may be concatenated and once again projected, such that the values are subsequently processed as illustrated in FIG. 9B (e.g., by a corresponding normalization layer 964, 980, or 984).

Feed forward layers 966 and 986 may each be a fully connected feed-forward network, which applies to each position. In examples, feed forward layers 966 and 986 each include a plurality of linear transformations with a rectified linear unit activation in between. In examples, each linear transformation is the same across different positions, while different parameters may be used as compared to other linear transformations of the feed-forward network.

Additionally, aspects of linear transformation 992 may be similar to the linear transformations discussed above with respect to multi-head attention layers 962, 978, and 982, as well as feed forward layers 966 and 986. Softmax 994 may further convert the output of linear transformation 992 to predicted next-token probabilities, as indicated by output probabilities 996. It will be appreciated that the illustrated architecture is provided in as an example and, in other examples, any of a variety of other model architectures may be used in accordance with the disclosed aspects. In some instances, multiple iterations of processing are performed according to the above-described aspects (e.g., using generative model package 904 in FIG. 9A or encoder 952 and decoder 954 in FIG. 9B) to generate a series of output tokens (e.g., words), for example which are then combined to yield a complete sentence (and/or any of a variety of other content). It will be appreciated that other generative models may generate multiple output tokens in a single iteration and may thus use a reduced number of iterations or a single iteration.

Accordingly, output probabilities 996 may thus form embedding output 906 according to aspects described herein, such that the output of the generative ML model (e.g., which may include structured output) is used as input for determining an action according to aspects described herein. In other examples, embedding output 906 is provided as generated output for CAPTCHA images.

Figure 10:
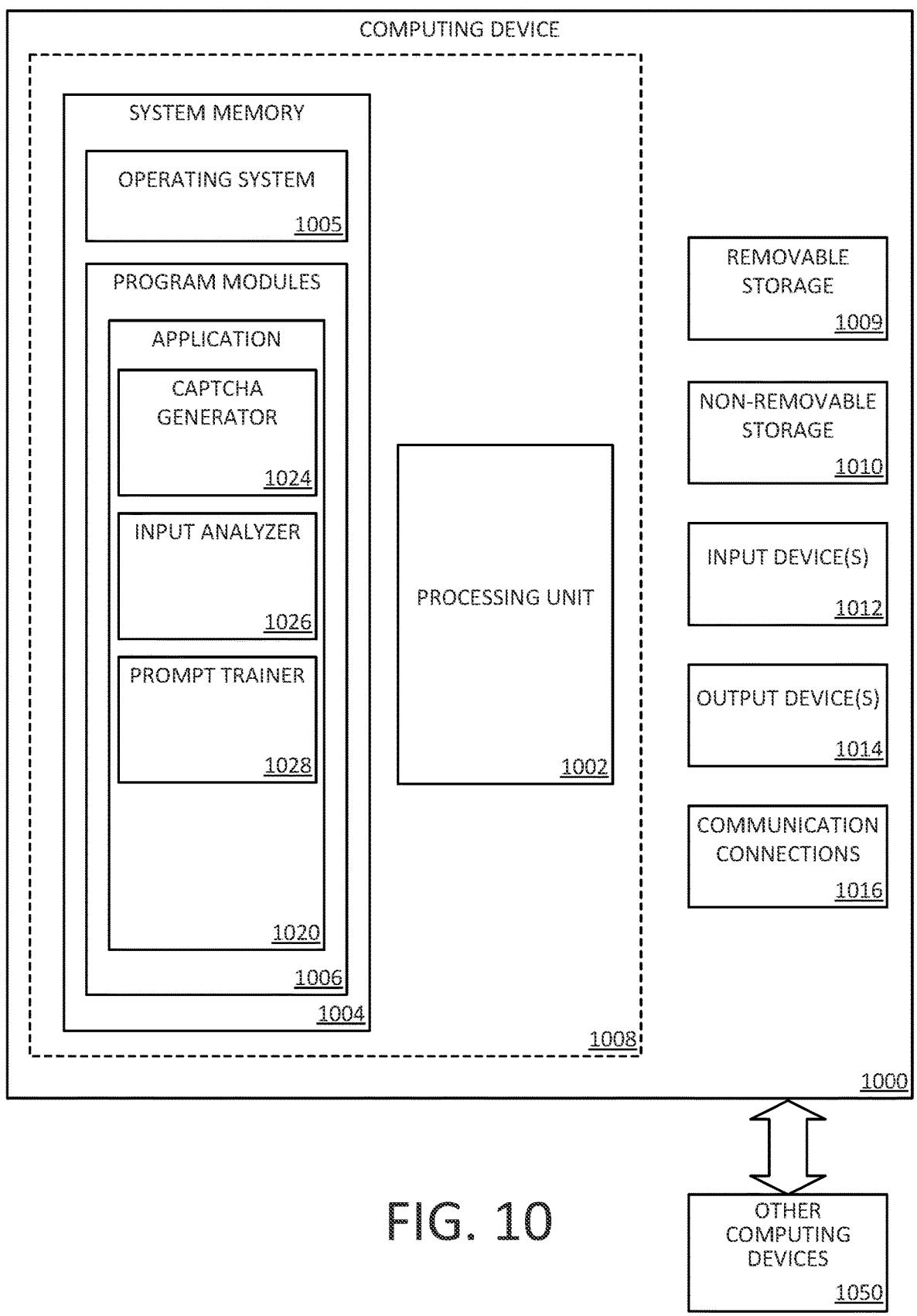
FIG. 10 illustrates a block diagram illustrating example physical components of a computing device with which aspects of the disclosure may be practiced.

FIGS. 10-9 and the associated descriptions provide a discussion of a variety of operating environments in which aspects of the disclosure may be practiced. However, the devices and systems illustrated and discussed with respect to FIGS. 10-9 are for purposes of example and illustration and are not limiting of a vast number of computing device configurations that may be utilized for practicing aspects of the disclosure, described herein.

FIG. 10 is a block diagram illustrating physical components (e.g., hardware) of a computing device 1000 with which aspects of the disclosure may be practiced. The computing device components described below may be suitable for the computing devices described above, including computing device 102 in FIG. 1. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories.

The system memory 1004 may include an operating system 1005 and one or more program modules 1006 suitable for running software application 1020, such as one or more components supported by the systems described herein. As examples, system memory 1004 may store CAPTCHA generator 1024, input analyzer 1026, and/or prompt trainer 1028. The operating system 1005, for example, may be suitable for controlling the operation of the computing device 1000.

Furthermore, aspects of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 (e.g., application 1020) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Some aspects of the disclosure may also be practiced using other technologies capable of performing logical operations such as, for example, AND, OR, and NOT, including but not limited to mechanical, optical, fluidic, and quantum technologies. In addition, some aspects of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing device 1000 may include one or more communication connections 1016 allowing communications with other computing devices 1050. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11:
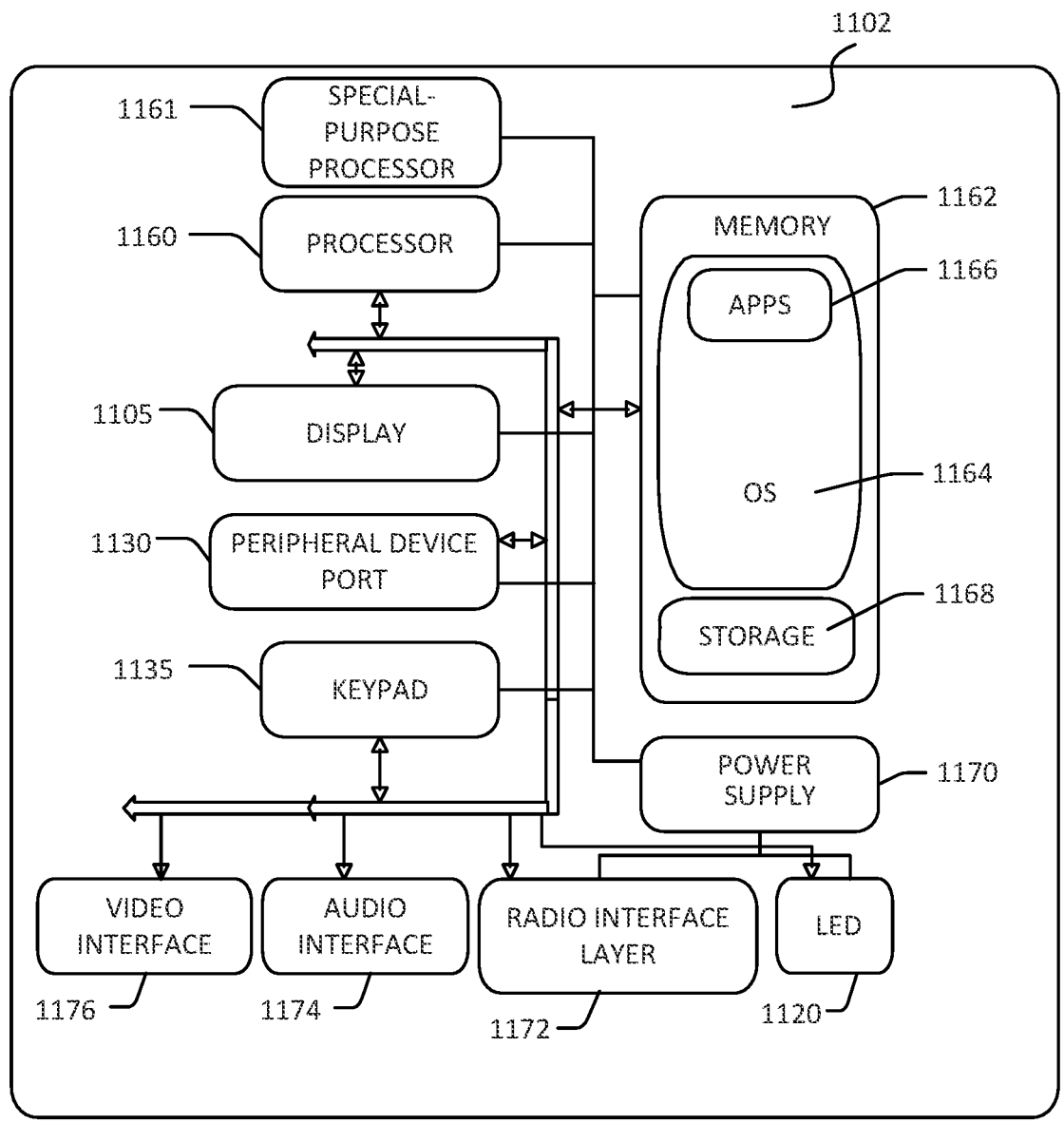
FIG. 11 illustrates a simplified block diagrams of a computing device with which aspects of the present disclosure may be practiced.

FIG. 11 is a block diagram illustrating the architecture of one aspect of a computing device. That is, the computing device can incorporate a system (e.g., an architecture) 1102 to implement some aspects. In some examples, the system 1102 is implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100 described herein (e.g., an embedding object memory insertion engine, an embedding object memory retrieval engine, etc.).

The system 1102 has a power supply 1170, which may be implemented as one or more batteries. The power supply 1170 might further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1120 may be used to provide visual notifications, and/or an audio interface 1174 may be used for producing audible notifications via the audio transducer 1125. In the illustrated example, the visual indicator 1120 is a light emitting diode (LED) and the audio transducer 1125 is a speaker. These devices may be directly coupled to the power supply 1170 so that when activated, they remain on for a duration dictated by the notification mechanism even though the processor 1160 and/or special-purpose processor 1161 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. In accordance with aspects of the present disclosure, the microphone may also serve as an audio sensor to facilitate control of notifications, as will be described below. The system 1102 may further include a video interface 1176 that enables an operation of an on-board camera 1130 to record still images, video stream, and the like.

A computing device implementing the system 1102 may have additional features or functionality. For example, the computing device may also include additional data storage devices (removable and/or non-removable) such as, magnetic disks, optical disks, or tape. Such additional storage is illustrated in FIG. 11 by the non-volatile storage area 1168.

Data/information generated or captured by the computing device and stored via the system 1102 may be stored locally on the computing device, as described above, or the data may be stored on any number of storage media that may be accessed by the device via the radio interface layer 1172 or via a wired connection between the computing device and a separate computing device associated with the computing device, for example, a server computer in a distributed computing network, such as the Internet. As should be appreciated such data/information may be accessed via the computing device via the radio interface layer 1172 or via a distributed computing network. Similarly, such data/information may be readily transferred between computing devices for storage and use according to well-known data/information transfer and storage means, including electronic mail and collaborative data/information sharing systems.

Figure 12:
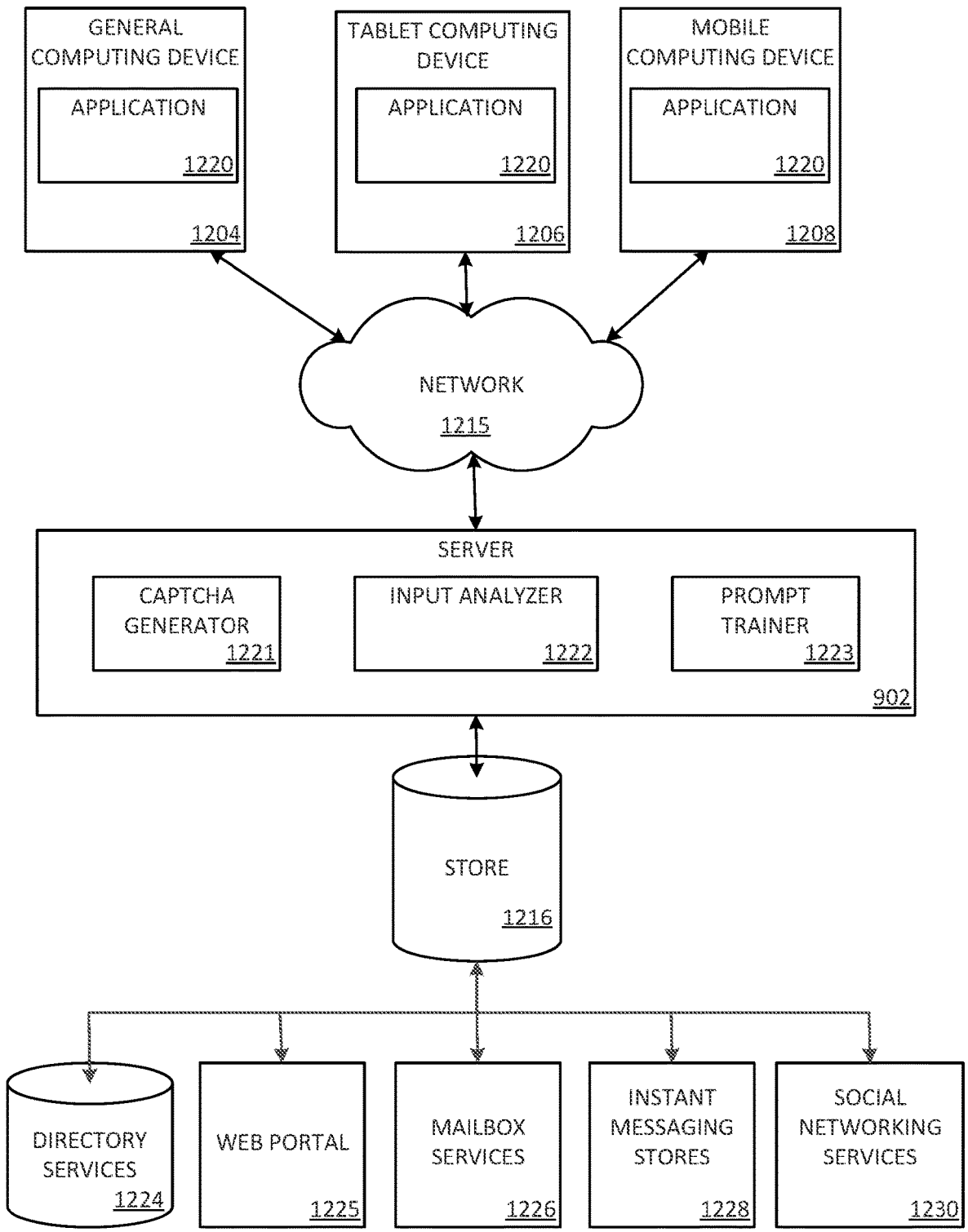
FIG. 12 is a simplified block diagram of a distributed computing system in which aspects of the present disclosure may be practiced.

FIG. 12 illustrates one aspect of the architecture of a system for processing data received at a computing system from a remote source, such as a personal computer 1204, tablet computing device 1206, or mobile computing device 1208, as described above. Content displayed at server device 1202 may be stored in different communication channels or other storage types. For example, various documents may be stored using a directory service 1224, a web portal 1225, a mailbox service 1226, an instant messaging store 1228, or a social networking site 1230.

An application 1220 (e.g., similar to the application 1020) may be employed by a client that communicates with server device 1202. Additionally, or alternatively, CAPTCHA generator 1221, input analyzer 1222, and/or prompt trainer 1223 may be employed by server device 1202. The server device 1202 may provide data to and from a client computing device such as a personal computer 1204, a tablet computing device 1206 and/or a mobile computing device 1208 (e.g., a smart phone) through a network 1215. By way of example, the computer system described above may be embodied in a personal computer 1204, a tablet computing device 1206 and/or a mobile computing device 1208 (e.g., a smart phone). Any of these examples of the computing devices may obtain content from the store 1216, in addition to receiving graphical data useable to be either pre-processed at a graphic-originating system, or post-processed at a receiving computing system.

As will be understood from the foregoing disclosure, one aspect of the technology relates to a method for generating captcha images. The method comprises: generating a plurality of images using a generative imaging model; providing the plurality of images to a user with a description corresponding to one of a similarity or difference between the plurality of images; receiving a selection of an image of the plurality of images; determining if the selection is correct based on the provided description; and outputting an indication of whether the selection is correct. In some examples, each of the plurality of images are generated based on a plurality of categories of variables. In some examples, the plurality of categories of variables comprise a subject, a verb, a setting, and a style. In some examples, the similarity or difference is associated with a category of the plurality of categories of variables. In some examples, the providing a plurality of images comprises displaying the plurality of images on a display screen of a computing device. In some examples, the plurality of images is a first plurality of images, the indication indicates that the selection is not correct, and the method further comprises generating a second plurality of images using the generative imaging model.

Another aspect of the technology relates to a method for generating captcha images. The method comprises: generating one or more images using a generative imaging model, wherein each of the one or more images are generated based on a respective prompt; providing the one or more images to a user; receiving a description of the one or more images; comparing the description of the one or more images to the respective prompts of the images; and outputting an indication of whether the description is correct, based on the comparison. In some examples, the description comprises natural language. In some examples, each of the plurality of images are generated based on a plurality of categories of variables. In some examples, the plurality of categories of variables comprise a subject, a verb, a setting, and a style. In some examples, the comparing comprises: generating an input embedding based on the received description; generating a prompt embedding based on the prompts used to generate the one or more images; determining a distance between the input embedding and the prompt embedding within a vector space; and comparing the distance to a similarity threshold, thereby determining if the description is correct. In some examples, the one or more images are a plurality of images, and the description comprises a description of one of a similarity or difference between the plurality of images. In some examples, the providing a plurality of images comprises displaying the plurality of images on a display screen of a computing device. In some examples, the indication indicates that the description is not correct, and the method further comprises: receiving a signal corresponding to the user terminating providing descriptions; and providing the prompt based on which the one or more images were generated.

A further aspect of the technology relates to a method for generating captcha images. The method comprises: generating a plurality of images using a generative imaging model, wherein each image of the plurality of images is generated based on a respective prompt; providing the plurality of images to a user; receiving a description of similarities or differences between the plurality of images; comparing the description to similarities or differences between the prompts based on which the plurality of images were generated; and outputting an indication of whether the description is correct, based on the comparison. In some examples, the description comprises natural language. In some examples, each of the plurality of images are generated based on a plurality of categories of variables. In some examples, the plurality of categories of variables comprise a subject, a verb, a setting, and a style. In some examples, the similarities or differences between the prompts are based on similarities or differences between the plurality of categories of variables. In some examples, the comparing comprises: generating an input embedding based on the received description of similarities or differences; generating a prompt embedding based on the similarities or difference between the prompts; determining a distance between the input embedding and the prompt embedding within a vector space; and comparing the distance to a similarity threshold, thereby determining if the description is correct.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for generating captcha images, the method comprising:
    generating a plurality of images using a generative imaging model, the generating comprising providing a plurality of prompts to the generative imaging model, each prompt of the plurality of prompts corresponding to a respective image of the plurality of images;
    providing the plurality of images to a user with a description corresponding to one of a similarity or difference between the plurality of images;
    receiving a selection of an image of the plurality of images;
    determining if the selection is correct based on the provided description and the plurality of prompts provided to the generative imaging model;
    outputting an indication of whether the selection is correct; and
    if the description is correct, based on the indication, granting a user access to a computer system protected by the generated images or, if the description is incorrect, based on the indication, rejecting access to the computer system.

2. The method of claim 1, wherein each of the plurality of images are generated based on a plurality of categories of variables.

3. The method of claim 2, wherein the plurality of categories of variables comprise a subject, a verb, a setting, and a style.

4. The method of claim 2, wherein the similarity or difference is associated with a category of the plurality of categories of variables.

5. The method of claim 1, wherein the providing a plurality of images comprises displaying the plurality of images on a display screen of a computing device.

6. The method of claim 1, wherein the plurality of images is a first plurality of images, wherein the indication indicates that the selection is not correct, and wherein the method further comprises generating a second plurality of images using the generative imaging model.

7. The method of claim 1, wherein the indication indicates that the description is not correct, and wherein the method further comprises:
    receiving a signal corresponding to the user terminating providing descriptions; and
    providing the prompt based on which the one or more images were generated.

8. A method for generating captcha images, the method comprising:
    generating one or more images using a generative imaging model, wherein each of the one or more images are generated based on a respective prompt;
    providing the one or more images to a user;
    receiving a description of the one or more images;
    comparing the description of the one or more images to the respective prompts of the images, wherein the comparing comprises:
    generating an input embedding based on the received description;
    generating a prompt embedding based on the prompts used to generate the one or more images;
    determining a semantic distance between the input embedding and the prompt embedding within a vector space; and
    comparing the semantic distance to a similarity threshold, thereby determining if the description is correct;
    outputting an indication of whether the description is correct, based on the comparison; and
    if the description is correct, based on the indication, granting a user access to a computer system protected by the generated images or, if the description is incorrect, based on the indication, not granting access to the computer system.

9. The method of claim 8, wherein the description comprises natural language.

10. The method of claim 8, wherein each of the plurality of images are generated based on a plurality of categories of variables.

11. The method of claim 10, wherein the plurality of categories of variables comprise a subject, a verb, a setting, and a style.

12. The method of claim 8, wherein the one or more images are a plurality of images, and wherein the description comprises a description of one of a similarity or difference between the plurality of images.

13. The method of claim 8, wherein the providing a plurality of images comprises displaying the plurality of images on a display screen of a computing device.

14. The method of claim 8, wherein the indication indicates that the description is not correct, and wherein the method further comprises:
    receiving a signal corresponding to the user terminating providing descriptions; and
    providing the prompt based on which the one or more images were generated.

15. A method for generating captcha images, the method comprising:
- generating a plurality of images using a generative imaging model, wherein each image of the plurality of images is generated based on a respective prompt;
- providing the plurality of images to a user;
- receiving a description of similarities or differences between the plurality of images;
- comparing the description to similarities or differences between the prompts based on which the plurality of images were generated;
- outputting an indication of whether the description is correct, based on the comparison; and
- if the description is correct, based on the indication, granting a user access to a computer system protected by the generated images or, if the description is incorrect, based on the indication, rejecting access to the computer system.

16. The method of claim 15, wherein the description comprises natural language.

17. The method of claim 15, wherein each of the plurality of images are generated based on a plurality of categories of variables.

18. The method of claim 17, wherein the plurality of categories of variables comprise a subject, a verb, a setting, and a style.

19. The method of claim 18, wherein the similarities or differences between the prompts are based on similarities or differences between the plurality of categories of variables.

20. The method of claim 15, wherein the comparing comprises:
- generating an input embedding based on the received description of similarities or differences;
- generating a prompt embedding based on the similarities or difference between the prompts;
- determining a distance between the input embedding and the prompt embedding within a vector space; and
- comparing the distance to a similarity threshold, thereby determining if the description is correct.

\* \* \* \* \*